(12) United States Patent
Jobe

(10) Patent No.: US 12,434,898 B2
(45) Date of Patent: *Oct. 7, 2025

(54) COMPOSTABLE INSULATION FOR SHIPPING CONTAINER

(71) Applicant: Vericool World LLC, San Ramon, CA (US)

(72) Inventor: Darrell Jobe, San Ramon, CA (US)

(73) Assignee: TemperPack Technologies, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,215

(22) Filed: Jul. 20, 2023

(65) Prior Publication Data

US 2023/0356916 A1    Nov. 9, 2023

Related U.S. Application Data

(63) Continuation of application No. 17/838,514, filed on Jun. 13, 2022, now Pat. No. 11,794,983, which is a (Continued)

(51) Int. Cl.
*B65D 81/38* (2006.01)
*B31D 5/00* (2017.01)
(Continued)

(52) U.S. Cl.
CPC ....... *B65D 81/3858* (2013.01); *B31D 5/0004* (2013.01); *B32B 3/28* (2013.01);
(Continued)

(58) Field of Classification Search
CPC .............. B65D 81/3862; B65D 81/051; B65D 81/052; B65D 81/3813; B65D 81/382;
(Continued)

(56) References Cited

U.S. PATENT DOCUMENTS

| 3,286,825 A | 11/1966 | Laas |
| 3,304,219 A | 2/1967 | Nickerson |

(Continued)

FOREIGN PATENT DOCUMENTS

| CA | 3219841 | 11/2022 |
| CN | 104309930 | 1/2015 |

(Continued)

OTHER PUBLICATIONS

U.S. Appl. No. 15/089,344, filed Apr. 1, 2016, Jobe.
(Continued)

*Primary Examiner* — Shawn M Braden
(74) *Attorney, Agent, or Firm* — TROUTMAN PEPPER LOCKE LLP; Christopher Forstner; Scott Bergeson

(57) ABSTRACT

A thermal insulation article includes a thermally insulating pad shaped to be positioned in a cavity of a rectangular prism shipping container. The pad includes a solid compostable panel formed primarily of starch and/or plant fiber pulp that holds together as a single unit, and a water-proof or water-resistant film forming a pocket enclosing the panel. The panel includes a first section, a second section, and a third section connecting the first section to the second section, the first and second section each having a central portion and two flaps that extend from the central portion beyond the third section, and wherein the panel is foldable into an open box.

28 Claims, 12 Drawing Sheets

Related U.S. Application Data continuation of application No. 16/774,739, filed on Jan. 28, 2020, now Pat. No. 11,358,780, which is a continuation of application No. 16/585,974, filed on Sep. 27, 2019, now Pat. No. 11,040,818, which is a continuation of application No. 15/932,239, filed on Feb. 16, 2018, now Pat. No. 10,807,788.

(60) Provisional application No. 62/460,023, filed on Feb. 16, 2017.

(51) Int. Cl.
- *B32B 3/28* (2006.01)
- *B32B 9/02* (2006.01)
- *B32B 9/04* (2006.01)
- *B32B 9/06* (2006.01)
- *B65D 65/46* (2006.01)
- *B31B 50/26* (2017.01)
- *B31B 120/40* (2017.01)

(52) U.S. Cl.
CPC ............... *B32B 9/02* (2013.01); *B32B 9/045* (2013.01); *B32B 9/06* (2013.01); *B65D 65/466* (2013.01); *B31B 50/26* (2017.08); *B31B 2120/402* (2017.08); *B31B 2247/00* (2013.01); *B32B 2255/12* (2013.01); *B32B 2255/24* (2013.01); *B32B 2262/062* (2013.01); *B32B 2307/304* (2013.01); *B32B 2307/7265* (2013.01); *B32B 2439/00* (2013.01)

(58) Field of Classification Search
CPC ............ B65D 2519/0086; B65D 81/03; B65D 81/127; B65D 65/466; B65D 81/3816; B65D 81/3818; B65D 2519/00497; B65D 2519/00925; B65D 81/3823
See application file for complete search history.

(56) References Cited

U.S. PATENT DOCUMENTS

| | | |
|---|---|---|
| 3,980,005 A | 9/1976 | Buonaiuto |
| 4,662,521 A | 5/1987 | Moretti |
| 5,208,267 A | 5/1993 | Neumann et al. |
| 5,363,744 A | 11/1994 | Pichler |
| 5,385,764 A | 1/1995 | Andersen et al. |
| 5,441,170 A | 8/1995 | Bane, III |
| 5,453,310 A | 9/1995 | Andersen et al. |
| 5,506,046 A | 4/1996 | Andersen et al. |
| 5,508,072 A | 4/1996 | Andersen et al. |
| 5,514,430 A | 5/1996 | Andersen et al. |
| 5,527,387 A | 6/1996 | Andersen et al. |
| 5,543,186 A | 8/1996 | Andersen et al. |
| 5,545,297 A | 8/1996 | Andersen et al. |
| 5,545,450 A | 8/1996 | Andersen et al. |
| 5,549,859 A | 8/1996 | Andersen et al. |
| 5,564,570 A | 10/1996 | Jaszai |
| 5,580,409 A | 12/1996 | Andersen et al. |
| 5,580,624 A | 12/1996 | Andersen et al. |
| 5,582,670 A | 12/1996 | Andersen et al. |
| 5,614,307 A | 3/1997 | Andersen et al. |
| 5,618,341 A | 4/1997 | Andersen et al. |
| 5,626,954 A | 5/1997 | Andersen et al. |
| 5,631,052 A | 5/1997 | Andersen et al. |
| 5,631,053 A | 5/1997 | Andersen et al. |
| 5,631,097 A | 5/1997 | Andersen et al. |
| 5,641,584 A | 6/1997 | Andersen et al. |
| 5,654,048 A | 8/1997 | Andersen et al. |
| 5,658,603 A | 8/1997 | Andersen et al. |
| 5,658,624 A | 8/1997 | Andersen et al. |
| 5,660,900 A | 8/1997 | Andersen et al. |
| 5,660,903 A | 8/1997 | Andersen et al. |
| 5,660,904 A | 8/1997 | Andersen et al. |
| 5,662,731 A | 9/1997 | Andersen et al. |
| 5,665,439 A | 9/1997 | Andersen et al. |
| 5,665,442 A | 9/1997 | Andersen et al. |
| 5,676,905 A | 10/1997 | Andersen et al. |
| 5,679,381 A | 10/1997 | Andersen et al. |
| 5,683,772 A | 11/1997 | Andersen et al. |
| 5,691,014 A | 11/1997 | Andersen et al. |
| 5,702,787 A | 12/1997 | Andersen et al. |
| 5,705,237 A | 1/1998 | Andersen et al. |
| 5,705,238 A | 1/1998 | Andersen et al. |
| 5,705,239 A | 1/1998 | Andersen et al. |
| 5,705,242 A | 1/1998 | Andersen et al. |
| 5,707,474 A | 1/1998 | Andersen et al. |
| 5,709,827 A | 1/1998 | Andersen et al. |
| 5,709,913 A | 1/1998 | Andersen et al. |
| 5,714,217 A | 2/1998 | Andersen et al. |
| 5,720,913 A | 2/1998 | Andersen et al. |
| 5,733,403 A | 3/1998 | Morley |
| 5,753,308 A | 5/1998 | Andersen et al. |
| 5,766,525 A | 6/1998 | Andersen et al. |
| 5,783,126 A | 7/1998 | Andersen et al. |
| 5,798,151 A | 8/1998 | Andersen et al. |
| 5,800,647 A | 9/1998 | Andersen et al. |
| 5,800,756 A | 9/1998 | Andersen et al. |
| 5,810,961 A | 9/1998 | Andersen et al. |
| 5,830,305 A | 11/1998 | Andersen et al. |
| 5,830,548 A | 11/1998 | Andersen et al. |
| 5,851,634 A | 12/1998 | Andersen et al. |
| 5,868,824 A | 2/1999 | Andersen et al. |
| 5,879,722 A | 3/1999 | Andersen et al. |
| 5,885,682 A | 3/1999 | Tanimoto et al. |
| 5,897,017 A | 4/1999 | Lantz |
| 5,912,058 A | 6/1999 | Takahashi et al. |
| 5,928,741 A | 7/1999 | Andersen et al. |
| 5,996,798 A | 12/1999 | Gessert |
| 6,030,673 A | 2/2000 | Andersen et al. |
| 6,050,412 A | 4/2000 | Clough |
| 6,090,195 A | 7/2000 | Andersen et al. |
| 6,180,037 B1 | 1/2001 | Andersen et al. |
| 6,257,764 B1 | 7/2001 | Lantz |
| 6,283,296 B1 | 9/2001 | Newman |
| 6,619,500 B1 | 9/2003 | Lantz |
| 6,938,968 B2 | 9/2005 | Tanimoto |
| RE39,339 E | 10/2006 | Andersen et al. |
| 7,452,316 B2 | 11/2008 | Cals et al. |
| 7,870,992 B2 | 1/2011 | Schille et al. |
| 8,011,511 B2 | 9/2011 | Oyler et al. |
| 8,557,367 B2 | 10/2013 | Netravali |
| 8,617,684 B2 | 12/2013 | Nomura |
| 8,763,811 B2 | 7/2014 | Lantz |
| 8,763,886 B2 * | 7/2014 | Hall .................... B65D 5/0227 220/592.25 |
| 9,290,313 B2 | 3/2016 | de Lesseux et al. |
| 9,550,618 B1 | 1/2017 | Jobe |
| 9,650,198 B2 | 5/2017 | de Lesseux et al. |
| 9,751,683 B1 | 9/2017 | Jobe |
| 9,957,098 B2 | 5/2018 | Jobe |
| 10,046,901 B1 | 8/2018 | Jobe |
| 10,625,923 B2 | 4/2020 | Jobe |
| 10,647,497 B2 | 5/2020 | Jobe |
| 10,807,788 B2 | 10/2020 | Jobe |
| 10,816,128 B2 | 10/2020 | McGoff et al. |
| 11,040,818 B2 | 6/2021 | Jobe |
| 11,358,780 B2 | 6/2022 | Jobe |
| 11,453,540 B2 | 9/2022 | Jobe |
| 11,794,983 B2 | 10/2023 | Jobe |
| 12,012,273 B2 | 6/2024 | Jobe |
| 2002/0064318 A1 | 5/2002 | Malone et al. |
| 2002/0068139 A1 | 6/2002 | Polak et al. |
| 2002/0164465 A1 | 11/2002 | Curro et al. |
| 2003/0082357 A1 | 5/2003 | Gokay |
| 2004/0058119 A1 | 3/2004 | Wynne |
| 2006/0260973 A1 | 11/2006 | Macinnes et al. |
| 2007/0051782 A1 | 3/2007 | Lantz |
| 2008/0260303 A1 | 10/2008 | DeLesseux et al. |
| 2008/0289302 A1 | 11/2008 | Vulpitta |
| 2009/0001086 A1 | 1/2009 | Roderick et al. |
| 2010/0314397 A1 | 12/2010 | Williams |
| 2011/0248038 A1 | 10/2011 | Mayer |

(56) References Cited

U.S. PATENT DOCUMENTS

| | | |
|---|---|---|
| 2011/0259895 A1 | 10/2011 | Parenteau et al. |
| 2012/0070609 A1 | 3/2012 | Poppe |
| 2012/0097067 A1 | 4/2012 | Fascio |
| 2012/0104009 A1 | 5/2012 | Fascio |
| 2012/0145568 A1 | 6/2012 | Collison et al. |
| 2012/0243808 A1 | 9/2012 | de Lesseux et al. |
| 2012/0279896 A1 | 11/2012 | Lantz |
| 2012/0312814 A1 | 12/2012 | Tolibas-Spurlock |
| 2013/0031874 A1 | 2/2013 | Roberts |
| 2014/0117071 A1 | 5/2014 | Kannankeril |
| 2014/0319018 A1 | 10/2014 | Collison |
| 2016/0052692 A1* | 2/2016 | Branham ............... B32B 5/18 156/308.2 |
| 2016/0194135 A1 | 7/2016 | Baker |
| 2017/0043937 A1 | 2/2017 | Lantz |
| 2017/0283157 A1 | 10/2017 | Jobe |
| 2018/0086538 A1 | 3/2018 | Jobe |
| 2018/0229917 A1 | 8/2018 | Jobe |
| 2018/0237182 A1 | 8/2018 | de Lesseux et al. |
| 2018/0327171 A1 | 11/2018 | Waltermire |
| 2018/0339838 A1 | 11/2018 | Hall |
| 2019/0367208 A1 | 12/2019 | Jobe |
| 2019/0367209 A1 | 12/2019 | Jobe |
| 2020/0024061 A1 | 1/2020 | Jobe |
| 2020/0165056 A1 | 5/2020 | Jobe |
| 2020/0407147 A1 | 12/2020 | Jobe |
| 2023/0032446 A1 | 2/2023 | Jobe |
| 2025/0121997 A1 | 4/2025 | Jobe |

FOREIGN PATENT DOCUMENTS

| | | |
|---|---|---|
| CN | 204323860 | 5/2015 |
| CN | 205499866 | 8/2016 |
| EP | 2000422 | 5/2012 |
| JP | H06-078227 | 11/1994 |
| JP | H0966971 | 3/1997 |
| JP | H10236545 | 9/1998 |
| JP | 2006-062691 | 3/2006 |
| JP | 2010-143617 | 7/2010 |
| JP | 2013-238305 | 11/2013 |
| JP | 2007-210626 | 8/2017 |
| WO | WO 1994/019172 | 9/1994 |
| WO | WO 1999/032374 | 7/1999 |
| WO | WO 2006/117801 | 11/2006 |
| WO | WO 2016/187435 | 11/2016 |
| WO | WO 2017/083738 | 5/2017 |

OTHER PUBLICATIONS

CN Office Action in Chinese Appln. No. 201880025505X, dated Mar. 25, 2021, 11 pages (with English Translation).
Extended European Search Report in European Appln. No. 18753873.1 dated Mar. 18, 2021, 7 pages.
International Search Report and Written Opinion in Application No. PCT/US2018/018429, dated Jun. 28, 2018, 16 pages.
U.S. Appl. No. 07/929,898, Andersen et al., filed Nov. 25, 1992.
U.S. Appl. No. 07/982,383, Andersen et al., filed Mar. 8, 1993.
U.S. Appl. No. 08/027,404, Andersen et al., filed Aug. 3, 1993.
U.S. Appl. No. 08/101,500, Andersen et al., filed Aug. 18, 1993.
U.S. Appl. No. 08/109,100, Andersen et al., filed Dec. 6, 1993.
U.S. Appl. No. 08/163,681, Andersen et al., filed Feb. 7, 1994.
U.S. Appl. No. 08/192,860, Khashoggi et al., filed Jan. 26, 1995.
U.S. Appl. No. 08/378,880, Andersen et al., filed Aug. 11, 1992.
[No Author Listed] "Biopolymer Use in Plastic Packaging," Association of Plastic Recyclers, Nov. 2023, 3 pages.
[No Author Listed] "Degradable Additives," Association of Plastic Recyclers, Aug. 2024. 4 pages.
[No Author Listed] "Design for Recyclability Playbook, U.S. Plastics Pact," US Plastics Pact, Jun. 2024, 23 pages.
[No Author Listed] "Paperboard Cartons," Fundamentals of Packaging Technology, 5th Edition, IoPP, 2013, Chapter 7, 24 pages.
[No Author Listed], "Guideline Documents: Recyclability of Paper Based Products," Eco Paper Loop, Dec. 30, 2014, 20 pages.
[No Author Listed], "How2Recycle: Guidelines for Use, Abbreviated", GreenBlue, Feb.-Jul. 2024, 62 pages.
[No Author Listed], "Voluntary Standard For Repulping and Recycling Corrugated Fiberboard Treated to Improve Its Performance in the Presence of Water and Water Vapor," Fibre Box Association, Aug. 16, 2013, 23 pages.
Amended Complaint in *Vericool World LLC v. Temperpack Technologies, Inc. et al.*, Civil Action No. 1:23-cv-01761-DJN-JFA, filed on Aug. 1, 2024, 14 pages.
Arif et al., " Evaluation of a Biodegradable Foam for Protective Packaging Applications," Packaging Technology and Science, Aug. 9, 2007, 20:413-419.
ASTM D6868-11, Standard Specification for Labeling of End Items that Incorporate Plastics and Polymers as Coatings or Additives with Paper and Other Substrates Designed to be Aerobically Composted in Municipal or Industrial Facilities, ASTM International, Feb. 2011, retrieved from URL<https://ia804503.us.archive.org/20/items/gov.law.astm.D6868.11/astm.D6868.11.pdf>, 3 pages [redactions original to source].
Astrx.org [online], "ASTRX Review of Material Flow at MRFs and Reprocessors," retrieved on Nov. 21, 2024, retrieved from URL<https://astrx.org/resources/astrx-study-of-material-recoverability/>, 9 pages.
Chiellini's Environmentally Compatible Food Packaging, Woodhead Publishing Limited, 2008, 45 pages.
Complaint in *Vericool World LLC v. Temperpack Technologies, Inc. et al.*, Civil Action No. 1:23-cv-01761-DJN-JFA, filed on Dec. 21, 2023, 12 pages.
Cook, "Plastic Recycling," Case studies for the Global Dimension in Engineering Education (GDEE), Barcelona, 2015, 19 pages.
Davis et al., "ASTRX Review of Material Flow at MRFs and Reprocessors," retrieved on Nov. 21. 2024, retrieved from URL<https://astrx.org/resources/astrx-study-of-material-recoverability/>, 49 pages.
Declaration of Glenn May submitted in Reexamination Control No. 90/019,578, dated Dec. 9, 2024, 26 pages.
Declaration of Jagjit (Jay) Singh, Ph.D. Pursuant to 37 C.F.R. § 1.132 in re Ex Parte Reexamination of U.S. Pat. No. 11,040,818, dated Jul. 10, 2024, 97 pages.
Declaration of Jagjit (Jay) Singh, Ph.D. Pursuant to 37 C.F.R. § 1.132 in re Ex Parte Reexamination of U.S. Pat. No. 11,358,780, dated Aug. 16, 2024, 103 pages.
Declaration of Jagjit (Jay) Singh, Ph.D. Pursuant to 37 C.F.R. § 1.132 in re Ex Parte Reexamination of U.S. Pat. No. 11,794,983, dated Jan. 6, 2025, 332 pages.
Declaration of Jagjit (Jay) Singh, Ph.D. Pursuant to 37 C.F.R. § 1.132 in re Ex Parte Reexamination of U.S. Pat. No. 11,794,983, dated Jul. 19, 2024, 82 pages.
Declaration of Jagjit (Jay) Singh, Ph.D. Pursuant to 37 C.F.R. § 1.132 in re Ex Parte Reexamination of U.S. Pat. No. 12,012,273, dated Sep. 26, 2024, 93 pages.
Declaration of Susan R. Koenig Pursuant to 37 C.F.R. § 1.132 in re Ex parte Reexamination of U.S. Pat. No. 11,794,983, dated Dec. 9, 2024, 5 pages.
Defendants' Initial Invalidity Contentions in *Vericool World LLC v. TemperPack Technologies, Inc., et al.*, Case No. 1:23-cv-01761-DJN-JFA, dated Aug. 19, 2024, 59 pages.
Dictionary.cambridge.org [online], "Corrugated: Definition in the Cambridge English Dictionary," upon information and belief, available no later than Aug. 20, 2024, retrieved on Nov. 20, 2024, retrieved from URL<https://dictionary.cambridge.org/us/dictionary/english/corrugated>, 10 pages.
Dilkes-Hoffman et al., "Flexible Packaging: Deepdive," Ellen Macarthur Foundation, Mar. 15, 2022, 20 pages.
Ellspoeco.com [online], "What is ASTM D6400? Understanding Compostable Standards," retrieved on Dec. 5, 2024, retrieved from URL< available at https://ellspoeco.com/what-is-astm-d6400-understanding-compostable-standards/>, 7 pages.
Ex Parte Reexamination Communication Transmittal Form in Reexamination Control No. 90/019,578, mailed on Oct. 28, 2024, 7 pages.
Extended European Search Report in European Appln No. 17776075.8, dated Mar. 8, 2019, 8 pages.

(56) References Cited

OTHER PUBLICATIONS

Extended European Search Report in European Appln. No. 21214503.1, dated Jun. 20, 2022, 9 pages.

Frontier Paper & Packaging [online], "Biocooler Pack-Out Instructions," Oct. 4, 2018, retrieved on Jan. 10, 2025, retrieved from URL<https://www.youtube.com/watch?v=Yn3hx9YnnDA>, 9 pages with screenshots.

Frontier Paper & Packaging [online], "Biocooler: Renewable, Compostable, Recyclable," Oct. 4, 2018, retrieved on Dec. 23, 2024, retrieved from URL<https://www.youtube.com/watch?v=lejfel4Z6LA>, 7 pages with screenshots.

Frontier Paper & Packaging [online], "Biocooler® Compostable Packaging Packout Animation," Dec. 21, 2017, retrieved on Dec. 23, 2024, retrieved from URL<https://www.youtube.com/watch?v=OLjuh YAgIXc>, 9 pages with screenshots.

Gong et al., "An Investigation into Triple Bottom Line Assessment of Eco-Friendly Office Supplies: File Folders," University of British Columbia, Nov. 27, 2014, 21 pages.

Greencellfoam.com [online], "Green Cell Foam," available on or before Jan. 24, 2015, via Internet Archive: Wayback Machine URL<https://web.archive.Org/web/20150124045220/http://www.greencellfoam.com/>, retrieved on Dec. 3, 2024, retrieved from URL<www.greencellfoam.com>, 1 page.

Hanlon, "Folding Cartons and Setup Boxes," Handbook of Package Engineering, 2nd Edition, 1992, Section 6, 28 pages.

Hersum et al., "Packaging Redesign and Information Accessibility for Semi-Direct Starter Cultures," Worcester Polytechnic Institute, Dec. 11, 2020, 149 pages.

International Search Report and Written Opinion in International Appln No. PCT/US2019/034222, dated Sep. 3, 2019, 10 pages.

International Search Report and Written Opinion in International Patent Application No. PCT/US2017/015893, received on May 19, 2017, 21 pages.

Interview Agenda submitted to Examiner in Reexamination Control No. 90/019,578, dated Oct. 28, 2024, 5 pages.

Invalidity of U.S. Pat. No. 11,040,818 ("'818 patent") By Branham (Exhibit A-1), Defendants' Initial Invalidity Contentions in *Vericool World LLC* v. *TemperPack Technologies, Inc., et al.*, Case No. 1:23-cv-01761-DJN-JFA, dated Aug. 19, 2024, 45 pages.

Invalidity of U.S. Pat. No. 11,040,818 ("'818 patent") By McGoff I (Exhibit A-2), Defendants' Initial Invalidity Contentions in *Vericool World LLC* v. *TemperPack Technologies, Inc., et al.*, Case No. 1:23-cv-01761-DJN-JFA, dated Aug. 19, 2024, 41 pages.

Invalidity of U.S. Pat. No. 11,358,818 ("'818 patent") By Polak (Exhibit A-3), Defendants' Initial Invalidity Contentions in *Vericool World LLC* v. *TemperPack Technologies, Inc., et al.*, Case No. 1:23-cv-01761-DJN-JFA, dated Aug. 19, 2024, 39 pages.

Invalidity of U.S. Pat. No. 11,358,780 ("'780 patent") By Branham (Exhibit B-1), Defendants' Initial Invalidity Contentions in *Vericool World LLC* v. *TemperPack Technologies, Inc., et al.*, Case No. 1:23-cv-01761-DJN-JFA, dated Aug. 19, 2024, 43 pages.

Invalidity of U.S. Pat. No. 11,358,780 ("'780 patent") By McGoff I (Exhibit B-2), Defendants' Initial Invalidity Contentions in *Vericool World LLC* v. *TemperPack Technologies, Inc., et al.*, Case No. 1:23-cv-01761-DJN-JFA, dated Aug. 19, 2024, 35 pages.

Invalidity of U.S. Pat. No. 11,358,780 ("'780 patent") By Polak (Exhibit B-3), Defendants' Initial Invalidity Contentions in *Vericool World LLC* v. *TemperPack Technologies, Inc., et al.*, Case No. 1:23-cv-01761-DJN-JFA, dated Aug. 19, 2024, 37 pages.

Invalidity of U.S. Pat. No. 11,794,983 ("'983 patent") By Branham (Exhibit C-1), Defendants' Initial Invalidity Contentions in *Vericool World LLC* v. *TemperPack Technologies, Inc., et al.*, Case No. 1:23-cv-01761-DJN-JFA, dated Aug. 19, 2024, 28 pages.

Invalidity of U.S. Pat. No. 11,794,983 ("'983 patent") By McGoff I (Exhibit C-2), Defendants' Initial Invalidity Contentions in *Vericool World LLC* v. *TemperPack Technologies, Inc., et al.*, Case No. 1:23-cv-01761-DJN-JFA, dated Aug. 19, 2024, 23 pages.

Invalidity of U.S. Pat. No. 11,794,983 ("'983 patent") By Polak (Exhibit C-3), Defendants' Initial Invalidity Contentions in *Vericool World LLC* v. *TemperPack Technologies, Inc., et al.*, Case No. 1:23-cv-01761-DIN-JFA, dated Aug. 19, 2024, 23 pages.

Invalidity of U.S. Pat. No. 12,012,273 ("'273 patent") By Branham (Exhibit D-1), Defendants' Initial Invalidity Contentions in *Vericool World LLC* v. *TemperPack Technologies, Inc., et al.*, Case No. 1:23-cv-01761-DJN-JFA, dated Aug. 19, 2024, 35 pages.

Invalidity of U.S. Pat. No. 12,012,273 ("'273 patent") By McGoff I (Exhibit D-2), Defendants' Initial Invalidity Contentions in *Vericool World LLC* v. *TemperPack Technologies, Inc., et al.*, Case No. 1:23-cv-01761-DIN-JFA, dated Aug. 19, 2024, 23 pages.

Invalidity of U.S. Pat. No. 12,012,273 ("'273 patent") By Polak (Exhibit D-3), Defendants' Initial Invalidity Contentions in *Vericool World LLC* v. *TemperPack Technologies, Inc., et al.*, Case No. 1:23-cv-01761-DIN-JFA, dated Aug. 19, 2024, 24 pages.

Kachook et al., "Understanding the Role of Compostable Packaging in North America," Sustainable Packaging Coalition, Jan. 2021, 59 pages.

Maust, "Guide to Recycled Plastics: Part 2 of 3, Sustainable Packaging Coalition," Sustainable Packaging Coalition, Nov. 2023, 69 pages.

Merriamwebster.com [online], "Primarily: Definition & Meaning," Dec. 4, 2024, retrieved on Dec. 9, 2024, retrieved from URL<https://www.merriamwebster.com/dictionary/primarily>, 4 pages.

N.C. Saha et al., "Food Packaging: Materials, Techniques and Environmental Issues," Flexible Packaging Material-Manufacturing Processes and its Application, Springer, 2022, Chapter 2, p. 52 (excerpted).

Nature-pack.com [online], "Biocooler®—Compostable Shipping Boxes," upon information and belief, available no later than Jul. 6, 2024, retrieved on Jan. 10, 2025, retrieved from URL<https://www.nature-pack.com/products/biocooler/>, 3 pages.

Nature-pack.com [online], "Join us in Las Vegas at the 2017 Pack Expo," Sep. 1, 2017, retrieved on Jan. 10, 2025, retrieved from URL<https://www.nature-pack.com/join-us-in-las-vegas-at-the-2017-pack-expo/>, 4 pages.

Nature-pack.com [online], "Nature-Pack™ Awarded Biocooler® Trademark," Mar. 27, 2016, retrieved on Dec. 20, 2024, retrieved from URL<https://www.nature-pack.com/nature-pack-awarded-biocooler-trademark/>, 3 pages.

Nature-pack.com [online], "Nature-Pack™ Ramps Up Commercial Production," Apr. 1, 2016, retrieved on Dec. 20, 2024, retrieved from URL<https://www.nature-pack.com/nature-pack-ramps-up-commercial-production/>, 3 pages.

Notice of intent to issue Ex Parte Reexamination Certificate in Reexamination Control No. 90/019,590, mailed on Nov. 12, 2024, 6 pages.

Notice of intent to issue Ex Parte Reexamination Certificate in Reexamination Control No. 90/019,683, mailed on Feb. 11, 2025, 6 pages.

Office Action in Canadian Appln. No. 3,019,638, dated Mar. 16, 2023, 3 pages.

Office Action in Chinese Application No. 201780025619.X, dated July 3. 2019, 15 pages (with English translation).

Office Action in Chinese Application No. 201780025619.X, dated May 7, 2020, 10 pages (with English translation).

Office Action in European Appln No. 17776075.8, Jan. 16, 2020, 4 pages.

Office Action in Japanese Appln. No. 2019-503196, dated Oct. 19, 2021, 6 pages (with English translation).

Office Action in Korean Appln. No. 10-2018-7031655, dated Nov. 9, 2023, 22 pages (with partial English translation).

Office Action in Reexamination Control No. 90/019,578 (the "'578 Reexam") for U.S. Pat. No. 11,040,818, mailed on Feb. 6, 2025, 31 pages.

Office Action in Reexamination Control No. 90/019,578 (the "'578 Reexam") for U.S. Pat. No. 11,040,818, mailed on Sep. 9, 2024, 20 pages.

Office Action in Reexamination Control No. 90/019,629 (the "'629 Reexam") for U.S. Pat. No. 11,358,780, mailed on Dec. 12, 2024, 12 pages.

Order (Granting Stay) in *Vericool World LLC* v. *TemperPack Technologies, Inc., et al.*, Case No. 1:23-cv-01761-DJN-JFA, issued on Sep. 13, 2024, 4 pages.

(56) References Cited

OTHER PUBLICATIONS

Order Granting Request for Ex Parte Reexamination in Reexamination Control No. 90/019,629 for U.S. Pat. No. 11,358,780, mailed on Aug. 29, 2024, 14 pages.
Order Granting Request for Ex Parte Reexamination in Reexamination Control No. 90/019,590 for U.S. Pat. No. 11,794,983, mailed on Aug. 20, 2024, 12 pages.
Order Granting Request for Ex Parte Reexamination in Reexamination Control No. 90/019,805 for U.S. Pat. No. 11,794,983, mailed on Feb. 18, 2025, 16 pages.
Order Granting Request for Ex Parte Reexamination in Reexamination Control No. 90/019,578 for U.S. Pat. No. 11,040,818, mailed on Jul. 30, 2024, 13 Pages.
Order Granting Request for Ex Parte Reexamination in Reexamination Control No. 90/019,683 for U.S. Pat. No. 12,012,273, mailed on Oct. 16, 2024, 13 Pages.
Packagingdive.com [online], "Compostable packaging's contested, complicated past doesn't determine its future," Dec. 5, 2023, retrieved from URL<https://www.packagingdive.com/news/compostable-packaging-bpi-cma-san-francisco-minneapolis/700923/>, 8 pages.
Plasticsrecycling.org [online], "PE Flexible Guidance, " Association of Plastic Recyclers, Oct. 23, 2024, retreived from URL< https://plasticsrecycling.org/apr-design-hub/apr-design-guide/pe-flexible/ >, 19 pages.
Plasticsrecycling.org [online], "The Plastic Recycling Process: Association of Plastic Recyclers (APR)," retrieved on Nov. 21, 2024, retrieved from URL< https://plasticsrecycling.org/how-recycling-works/the-plastic-recycling-process/>, 13 pages.
Pollock et al., "How To Know If Your Paper Packaging Is Recyclable," GreenBlue, Jan. 2023, 21 pages.
Redline Comparison of U.S. Appl. No. 15/419,892 to U.S. Appl. No. 15/279,172, 19 pages.
Redline Comparison of U.S. Appl. No. 62/296,763 to U.S. Appl. No. 62/296,763, 98 pages.
Request for Ex Parte Reexamination of U.S. Pat. No. 11,040,818 by TemperPack, filed on Jul. 15, 2024, 102 pages.
Request for Ex Parte Reexamination of U.S. Pat. No. 11,358,780 by TemperPack, filed on Aug. 20, 2024, 105 pages.
Request for Ex Parte Reexamination of U.S. Pat. No. 11,794,983 by TemperPack, filed on Jul. 22, 2024, 80 pages.
Request for Ex Parte Reexamination of U.S. Pat. No. 12,012,273 by TemperPack, filed on Sep. 26, 2024, 93 pages.
Saha et al., "Flexible Packaging Material-Manufacturing Processes and Its Application," Food Packaging: Materials, Techniques, and Environmental Issues, Springer, 2022, Chapter 2, p. 52.
Second Request for Ex Parte Reexamination of U.S. Pat. No. 11,794,983 by TemperPack, filed on Jan. 7, 2025, 109 pages.
Song et al., "Biodegradable and Compostable Alternatives to Conventional Plastics," Phil. Trans. R. Soc. B, 2009, 364:2127-2139.
Temperpack.com [online], "Green Cell Foam," upon information and belief available no later than Jul. 22, 2024, retrieved on Nov. 20, 2024, retrieved from URL<https://www.temperpack.com/green-cell-foam-2/>, 6 pages.
Theconsumergoodsforum.com [online], "Golden Design Rules for Optimal Plastic Design, Production and Recycling," retrieved on Nov. 21, 2024), retrieved from URL< https://www.theconsumergoodsforum.com/environmental-sustainability/plastic-waste/key-projects/packaging-design/>, 4 pages.
Verghese et al., "Packaging Materials," Packaging for Sustainability, Springer, 2012, Chapter 6, p. 225.
Willett et al., "Processing and Properties of Extruded Starch/Polymer Foams," Polymer 43, Jan. 8, 2002, pp. 5935-5947.
Declaration of Jagjit (Jay) Singh, Ph.D. Pursuant to 37 C.F.R. § 1.132 in re Second Request for Ex Parte Reexamination of U.S. Pat. No. 12,012,273, dated Mar. 30, 2025, 333 pages.
Declaration of Susan R. Koenig Pursuant to 37 C.F.R. § 1.132 in re Ex parte Reexamination of U.S. Pat. No. 12,012,273, dated Mar. 28, 2025, 5 pages.
Notice of intent to issue Ex Parte Reexamination Certificate in Reexamination Control No. 90/019,578, mailed on Apr. 14, 2025, 7 pages.
Notice of intent to issue Ex Parte Reexamination Certificate in Reexamination Control No. 90/019,629, mailed on Mar. 13, 2025, 7 pages.
Notice of allowance in U.S. Appl. No. 18/745,554, mailed Apr. 9, 2025, 6 pages.
Reexamination Certificate issued Mar. 26, 2025 in Reexamination Control No. 90/019,683, 2 pages.
Second Request for Ex Parte Reexamination of U.S. Pat. No. 12,012,273 by TemperPack, filed on Mar. 31, 2025, 116 pages.
Notice of Intent to issue Ex Parte Reexamination Certificate in Reexamination Control No. 90/019,629, mailed Mar. 13, 2025, 7 pages.
Order Granting Request for Ex Parte Reexamination in Reexamination Control No. 90/019,894 for U.S. Pat. No. 12,012,273, mailed on Apr. 21, 2025, 18 pages.
Reexamination Certificate issued Jun. 5, 2025 in Reexamination Control No. 90/019,578, 4 pages.
Reexamination Certificate issued May 27, 2025 in Reexamination Control No. 90/019,629, 3 pages.

\* cited by examiner

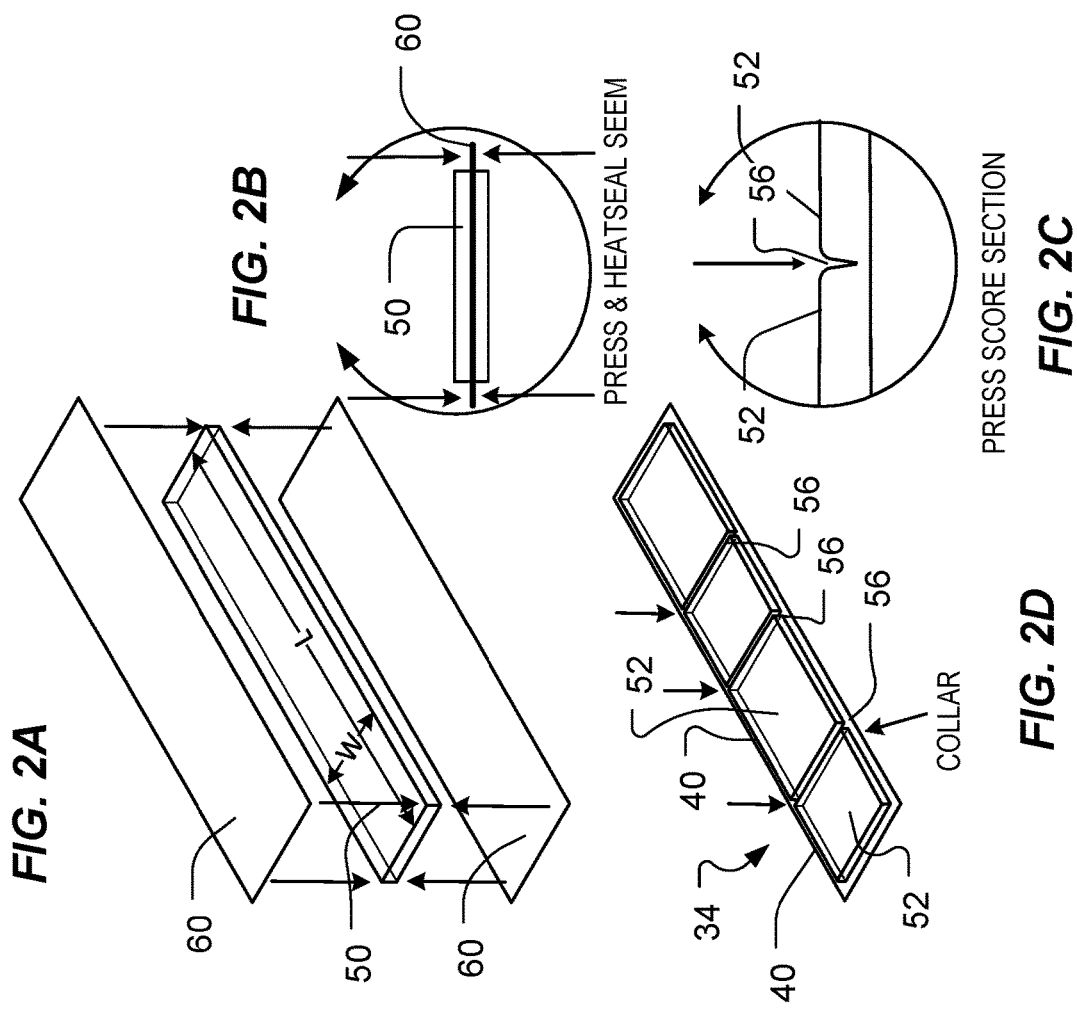

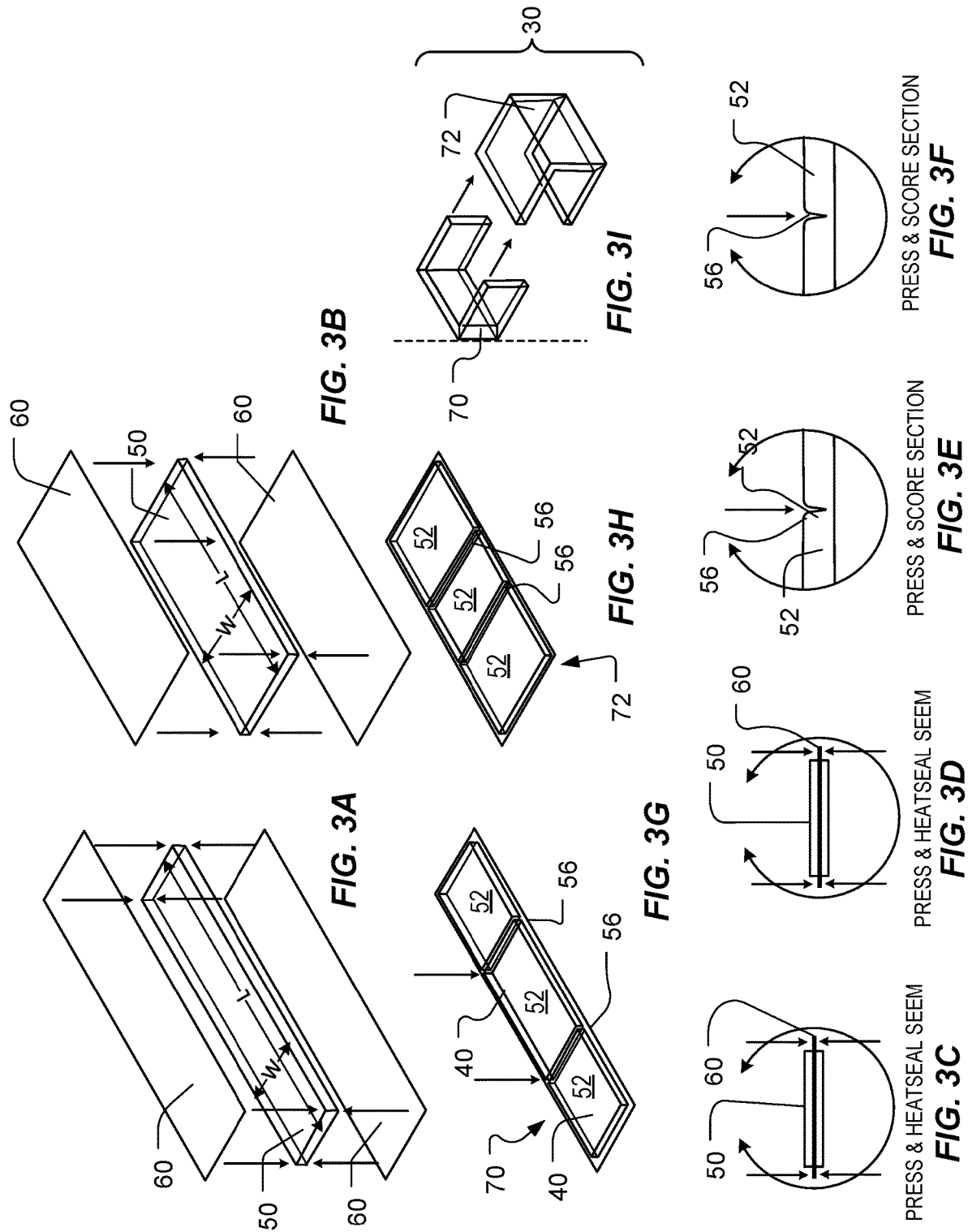

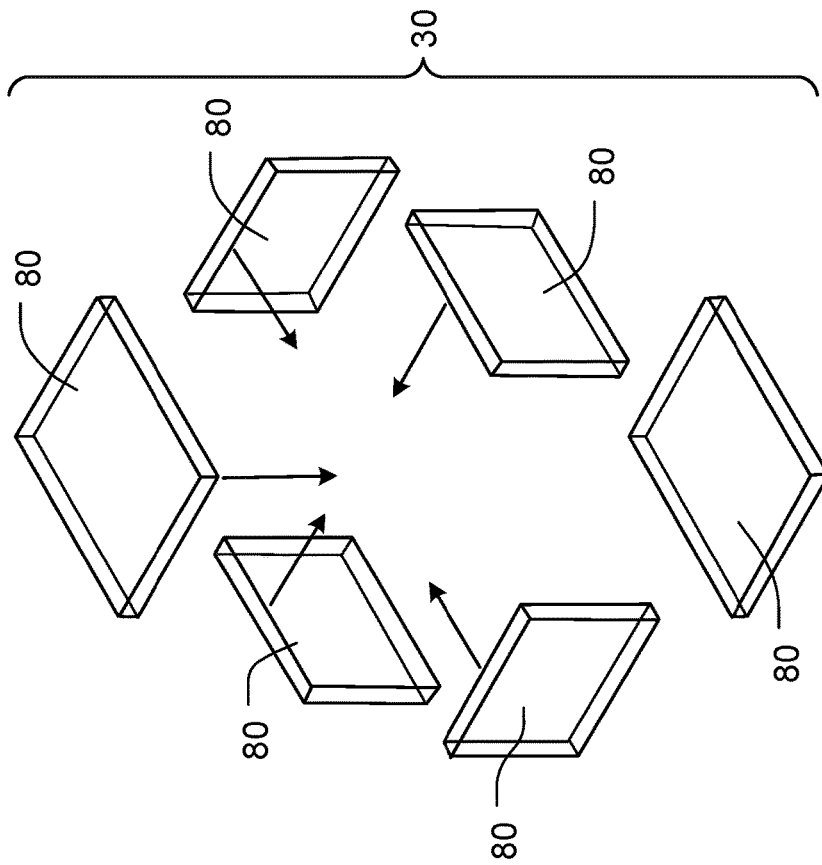
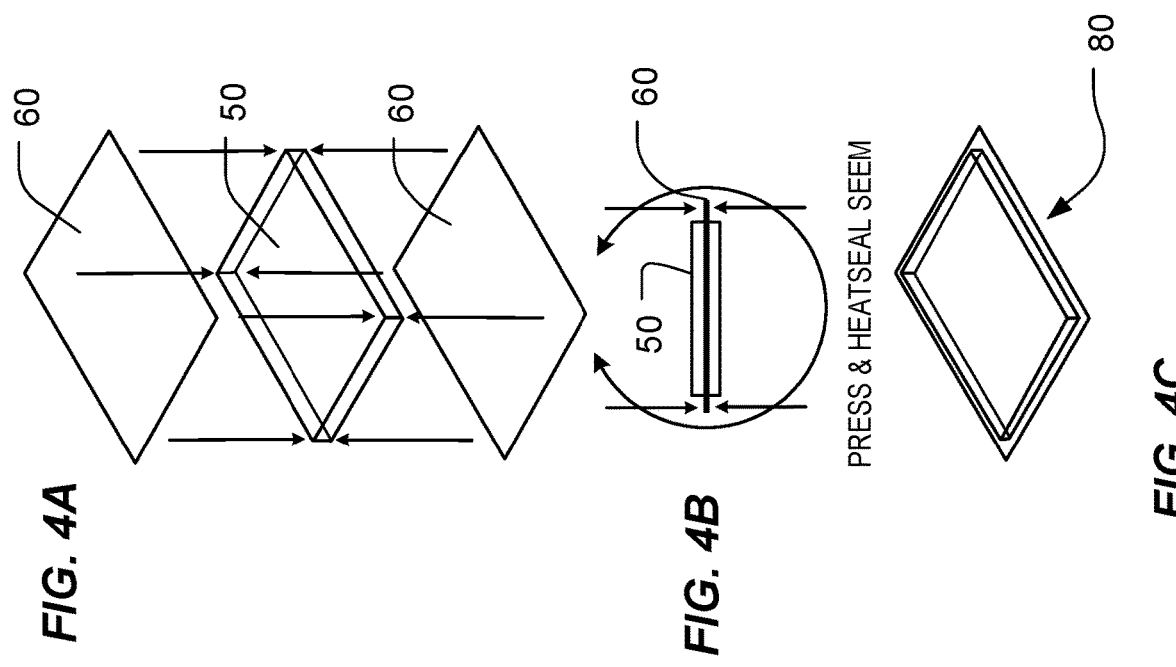

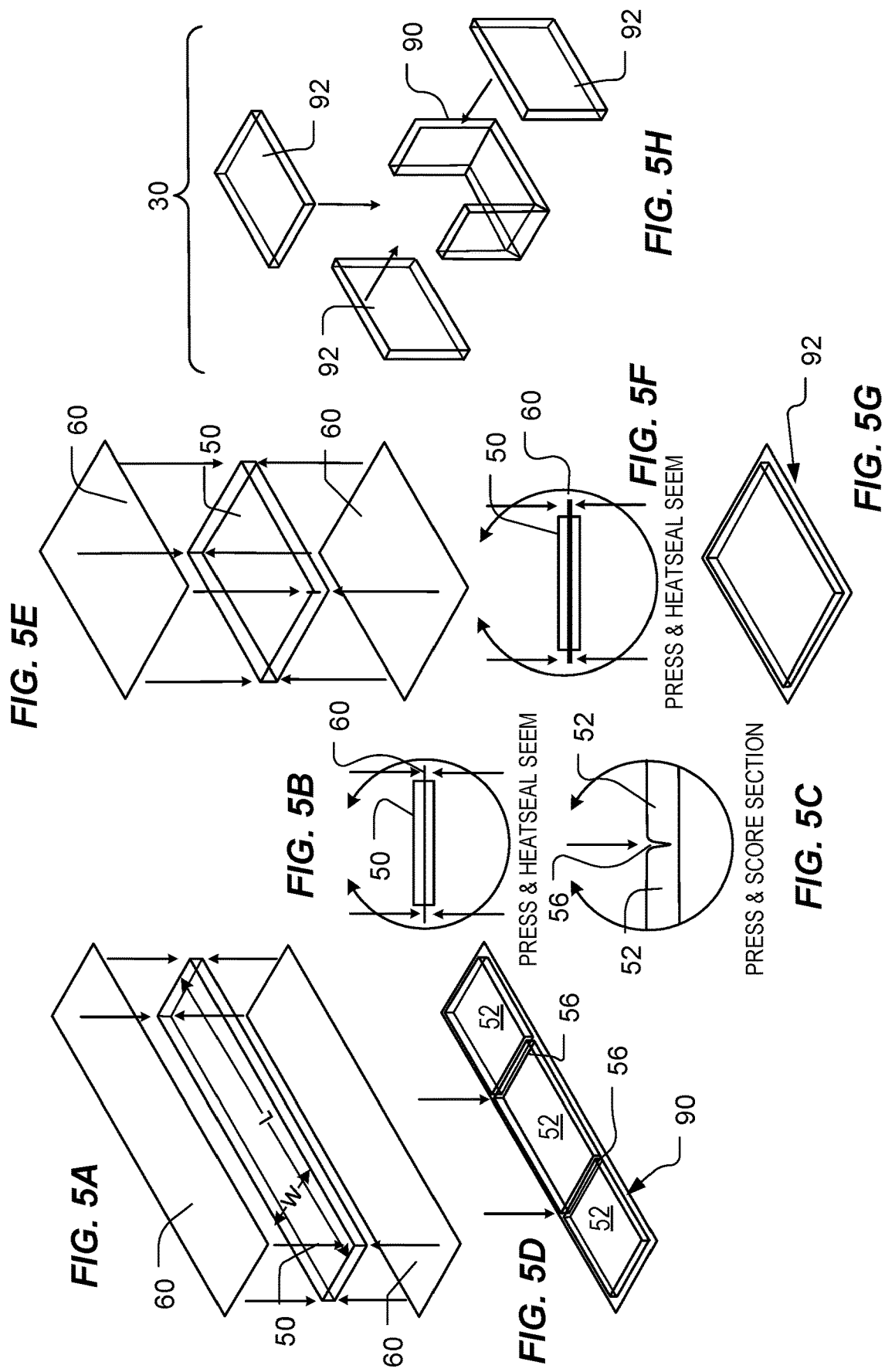

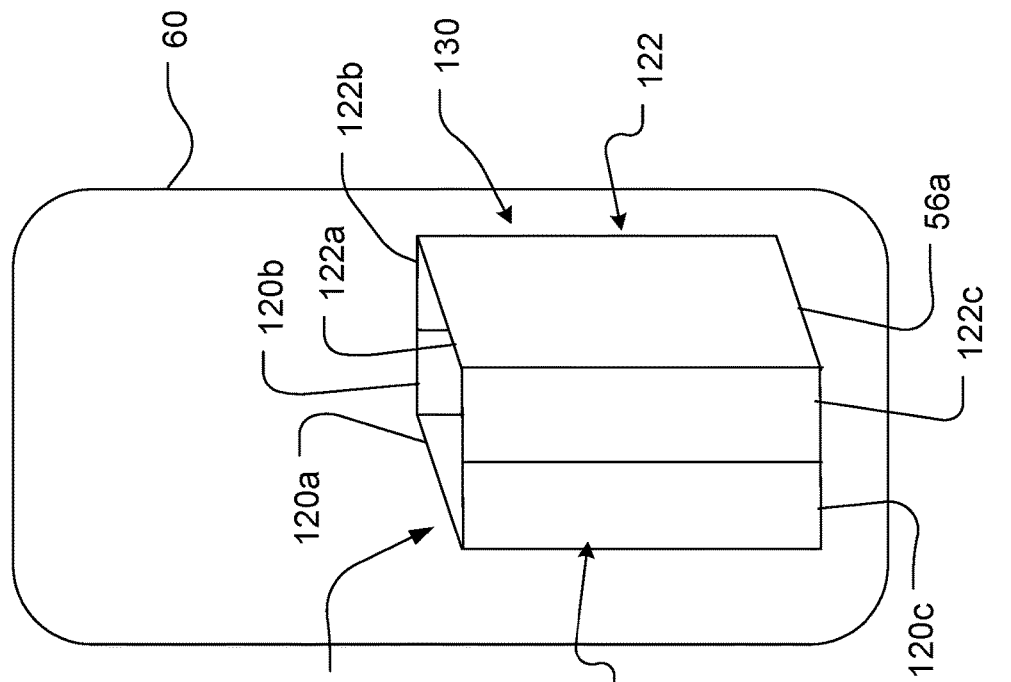
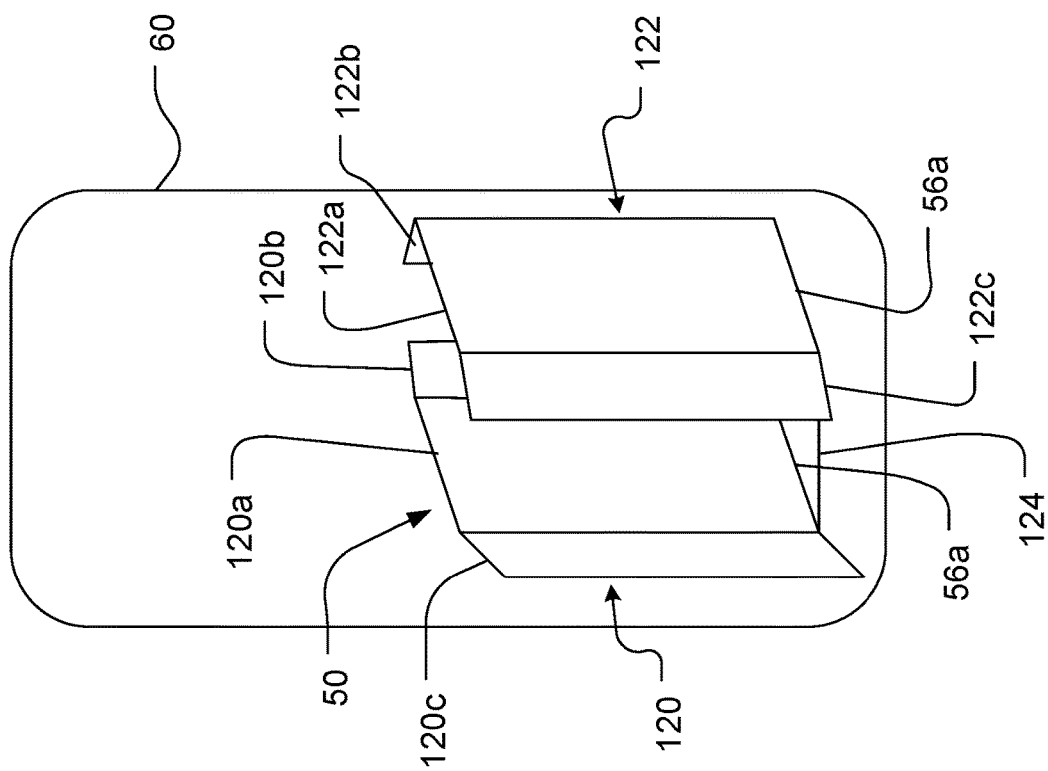
FIG. 13B
FIG. 13A

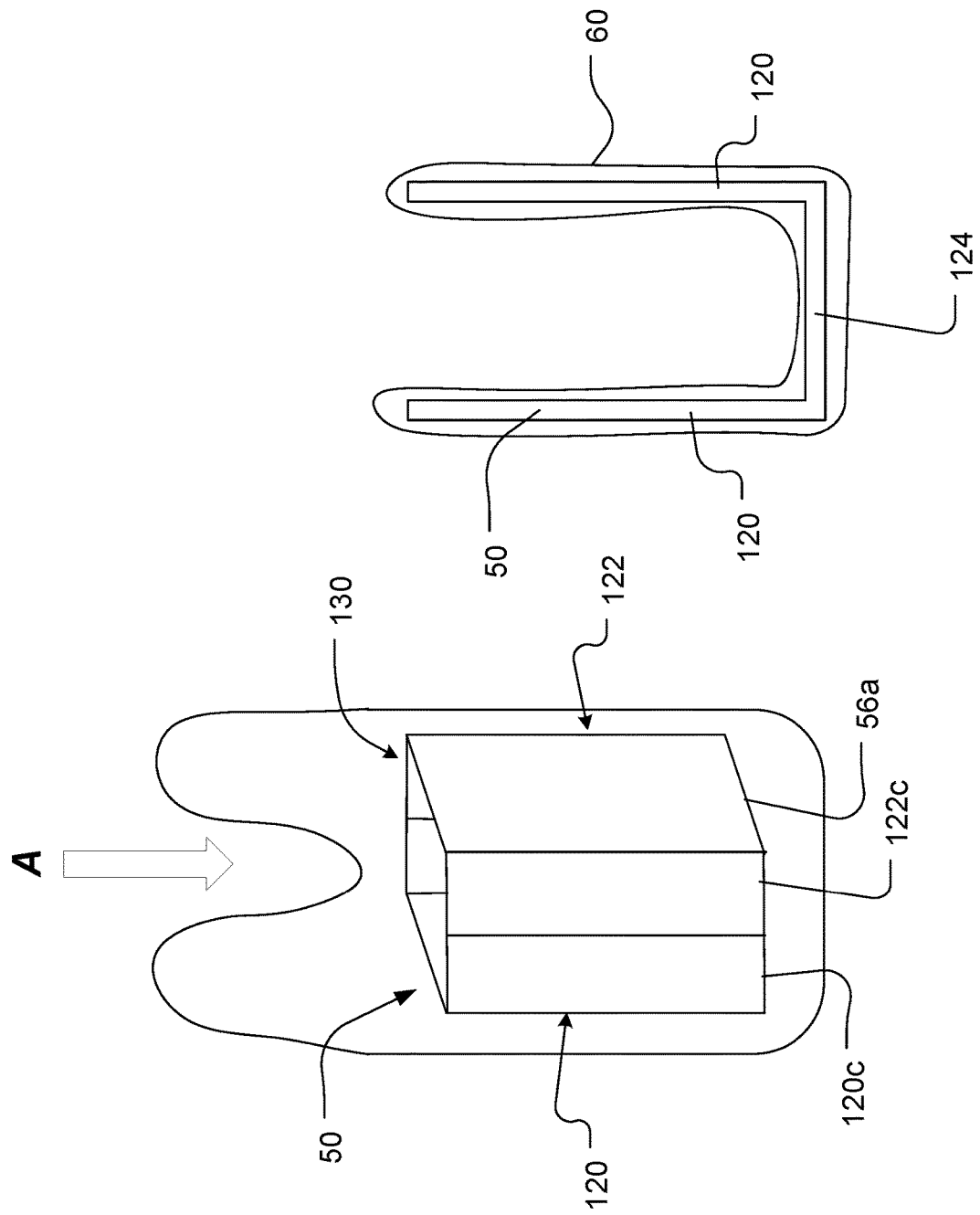

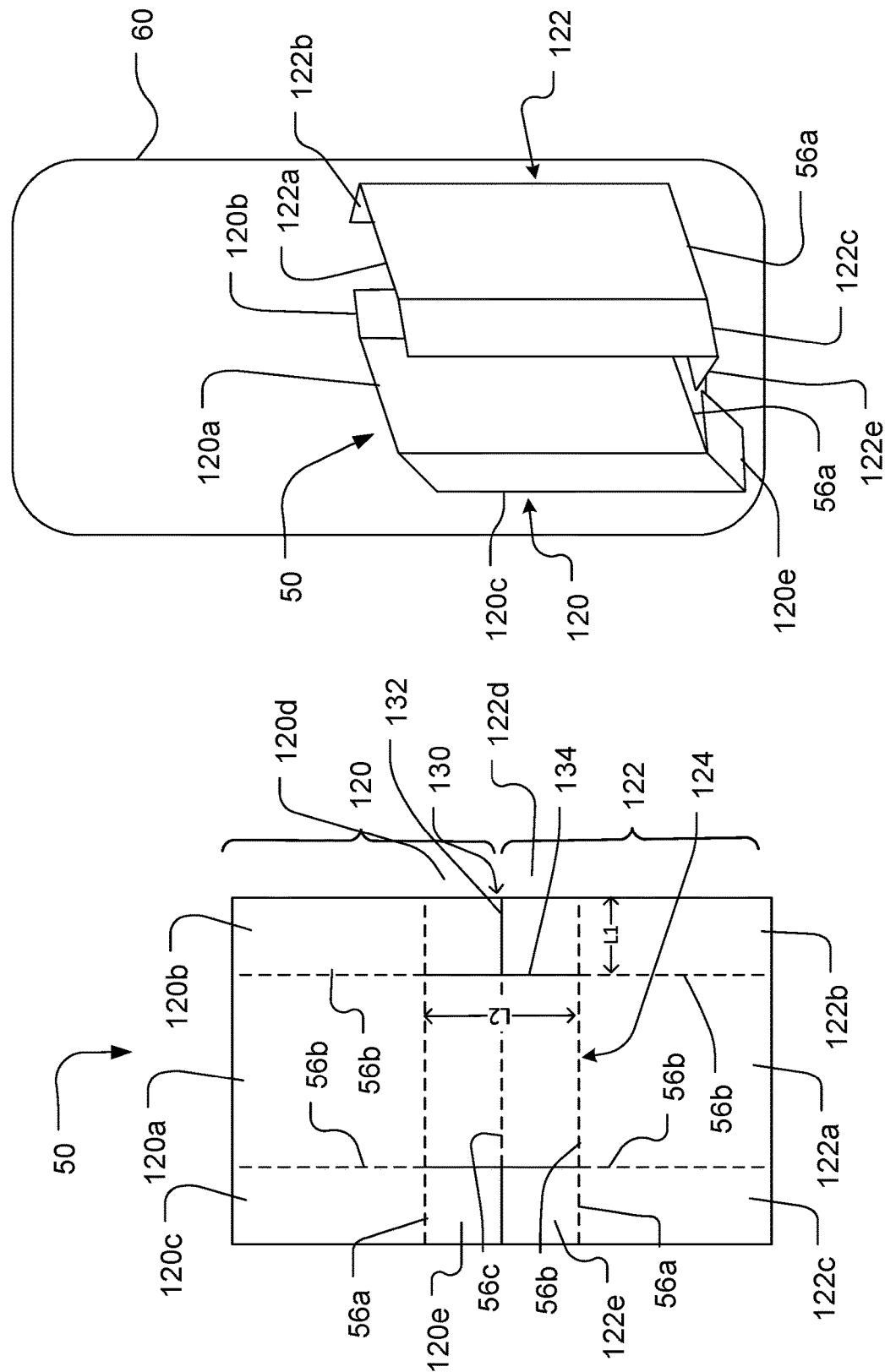

COMPOSTABLE INSULATION FOR SHIPPING CONTAINER

CROSS-REFERENCE TO RELATED APPLICATIONS

This application is a continuation of U.S. application Ser. No. 17/838,514, filed Jun. 13, 2022, which is a continuation of U.S. application Ser. No. 16/774,739, filed Jan. 28, 2020, which a continuation of U.S. application Ser. No. 16/585,974, filed Sep. 27, 2019, which is a continuation of U.S. application Ser. No. 15/932,239, filed Feb. 16, 2018, which claims priority to U.S. Provisional Patent Application Ser. No. 62/460,023, filed Feb. 16, 2017, the entire disclosures of which are incorporated by reference.

TECHNICAL FIELD

This invention relates to an insulating pad for a shipping container, and more particularly where the insulating material is compostable.

BACKGROUND

A conventional container for shipping temperature sensitive products includes a cardboard box, inside of which is a thermally insulating material. A conventional thermally insulating material is expanded polystyrene (EPS), e.g., Styrofoam. For example, panels of the expanded polystyrene can line the walls of the box, and another packing material, e.g., bubble wrap, can be placed surround and cushion the item being shipped inside the panels. Alternatively, expanded polystyrene can be machined or molded to form a "cooler" into which the item being shipped can be placed—this does not need an external box. In either case, a coolant, e.g., ice, dry ice or a gel pack, is placed in the cavity in the box with the item being shipped.

EPS is relatively inexpensive and easily formed into a variety of shapes, but is not compostable. Consequently, disposing of the material of the container can be a problem.

SUMMARY

Packaging material is described that provides for thermal insulation of an item being shipped while the components are still recyclable or compostable.

In one aspect, a thermal insulation article includes a thermally insulating pad shaped to be positioned in a cavity of a rectangular prism shipping container. The pad includes a solid compostable panel formed primarily of starch and/or plant fiber pulp that holds together as a single unit, and a water-proof or water-resistant film forming a pocket enclosing the panel. The panel includes a first section, a second section, and a third section connecting the first section to the second section, the first and second section each having a central portion and two flaps that extend from the central portion beyond the third section, and wherein the panel is foldable into an open box with the narrow section providing a floor of the box, central portions of the first and second section providing opposing first and second side walls of box, a first pair of flaps from the first and second section providing a third side wall of the box, and a second pair of flaps from the first and second section providing a fourth side wall of the box opposite the third side wall.

Implementations may include one or more of the following features.

The panel may be formed of a material sufficiently soft to be manually folded. The panel may be scored to assist at least some folds. The panel may be scored at a connection of the third section to the first section and scored at a connection of the third section to the second section. The panel may be scored at a connection of each respective flap to respective central sections. The panel may be scored across a midline of the third section such that the panel is configured to be folded in half. The panel may be folded in half and may occupy about half of the pocket formed by the film. The panel may be scored with a score that extends partially but not entirely through the thickness panel. The score may be a compressed portion or a cut out portion of the panel.

The two flaps that extend from the central portion may be a first two flaps, and the first and second section may each have a second two flaps that extend from the first two flaps. The second two flaps may be foldable inward to overlap a portion of the floor provided by the third section. The panel in an unfolded position may include a pair of T-shaped cuts on opposing edges of the panel. The panel in an unfolded position may have a pair of recesses on opposing edges of the panel, the recesses defining the third section as narrower than the first section and the second section. A width of each of the two flaps may be one-half to one times of a width of the third section between the first section and the second section.

The panel may be formed primarily of starch, e.g., a grain starch, a root starch, a vegetable starch, or combinations thereof. The panel may be formed primarily of plant fiber pulp, e.g., fibers from wood, corn, cotton, coconut or flax, or combinations thereof. The panel may have a uniform homogenous composition. The panel may be a single unitary body. The panel may have a thickness between of about ¼ and 1 inch. One or more surfaces of the panel may be corrugated.

The film may be water-proof. The film may be compostable. The film may include polyethylene or paper. A water-resistant or water-proof coating may be formed on the paper. The coating may include wax.

In another aspect, a method of assembling a thermal insulation article includes unfolding a solid compostable panel formed primarily of starch and/or plant fiber pulp that holds together as a single unit while the panel is contained within a pocket of a water-proof or water-resistant film; and refolding the solid compostable panel into a container that has an opening at top while the panel is contained within the pocket.

Implementations may include one or more of the following features.

After refolding, a portion of the film may be pushed into the opening on the top of the container such that the film lines an interior and an exterior of the container. Refolding may include folding along scores formed in the panel.

Potential advantages may include (and are not limited to) one or more of the following.

The insulating material of the packaging material is compostable, and the film containing the insulating material is compostable or recyclable and also easily disposed. The packaging is easy to assemble, and can be manufactured at low cost. The packaging can provide equivalent thermal insulation to expanded polystyrene, and can be disposed in commercial and residential composting or recycling bins or garbage cans. The container components can be shipped in bulk in an unassembled state with minimal cost increase, and assembly of the container can be performed by the user.

The details of one or more embodiments are set forth in the accompanying drawings and the description below. Other features, objects, and advantages of the invention will be apparent from the description and drawings, and from the claims.

DESCRIPTION OF DRAWINGS

FIGS. 2A-2G illustrate an example of construction of the pads of the insulating shipping container of FIG. 1.

FIGS. 3A-3I illustrate an example that includes two three-sectioned pads for the insulating shipping container.

FIGS. 4A-4D illustrate an example that includes six individual pads for the insulating shipping container.

FIGS. 5A-5H illustrate an example that includes a three-sectioned pad and three individual pads for the insulating shipping container.

FIGS. 13A-13C are composite perspective and cross-sectional views illustrating a method of assembling packaging for a shipping container.

FIG. 13D is a cross-sectional view illustrating a method of assembling packaging for a shipping container.

FIG. 14 is a plan view of another implementation of a panel.

FIG. 15 is composite perspective and cross-sectional views illustrating a method of assembling packaging for a shipping container.

Like reference symbols in the various drawings indicate like elements.

DETAILED DESCRIPTION

Initially, some terminology may be beneficial. "Biodegradable" simply means that a product will eventually disintegrate into to innocuous material. "Recyclable" indicates that a product can be reused or treated in order to be made suitable for reuse. "Compostable" indicates both that a product will decompose quickly, e.g., within 180 days, and that the product will decompose into material that can be used as fertilizer (e.g., per ASTM D6400 or EN 13432). Products that are "biodegradable" need not be (and usually aren't) "compostable." First, since there is no particular time limit for a "biodegradable" product to disintegrate, it need not decompose quickly. For example, even aluminum cans will biodegrade given several centuries. Moreover, even a biodegradable product that decomposes quickly might not provide a material that is suitable as fertilizer.

Most conventional thermally insulating materials for packaging, e.g., EPS, are not compostable. One technique for using a compostable insulating packaging material is to fill a volume between an inner wall and an outer wall of a box with loose-fill compostable cornstarch foam pellets (e.g., packing "peanuts") using layered stratification, and then compress each layer of foam pellets in within this volume to compact them. This technique requires either multiple boxes or a specialized box having both inner and outer walls, and also requires specialized machinery for layered stratification compaction of the pellets. The additional or specialized boxes increase the cost. In addition, the loose fill pellets are difficult to compost because they are messy when removed from the box. Moreover, a large amount of pressure, e.g., 25 lbs. or more, needs to be applied to close the top flaps of the box due to the resistance from the pellets.

However, instead of loose-fill foam pellets, a solid compostable panel formed primarily of extruded starch, e.g., milled extruded sorghum, can be enclosed by a biodegradable or compostable film to provide a thermally insulating pad, and this pad can be used as the insulating packaging in the container.

Figure 1:
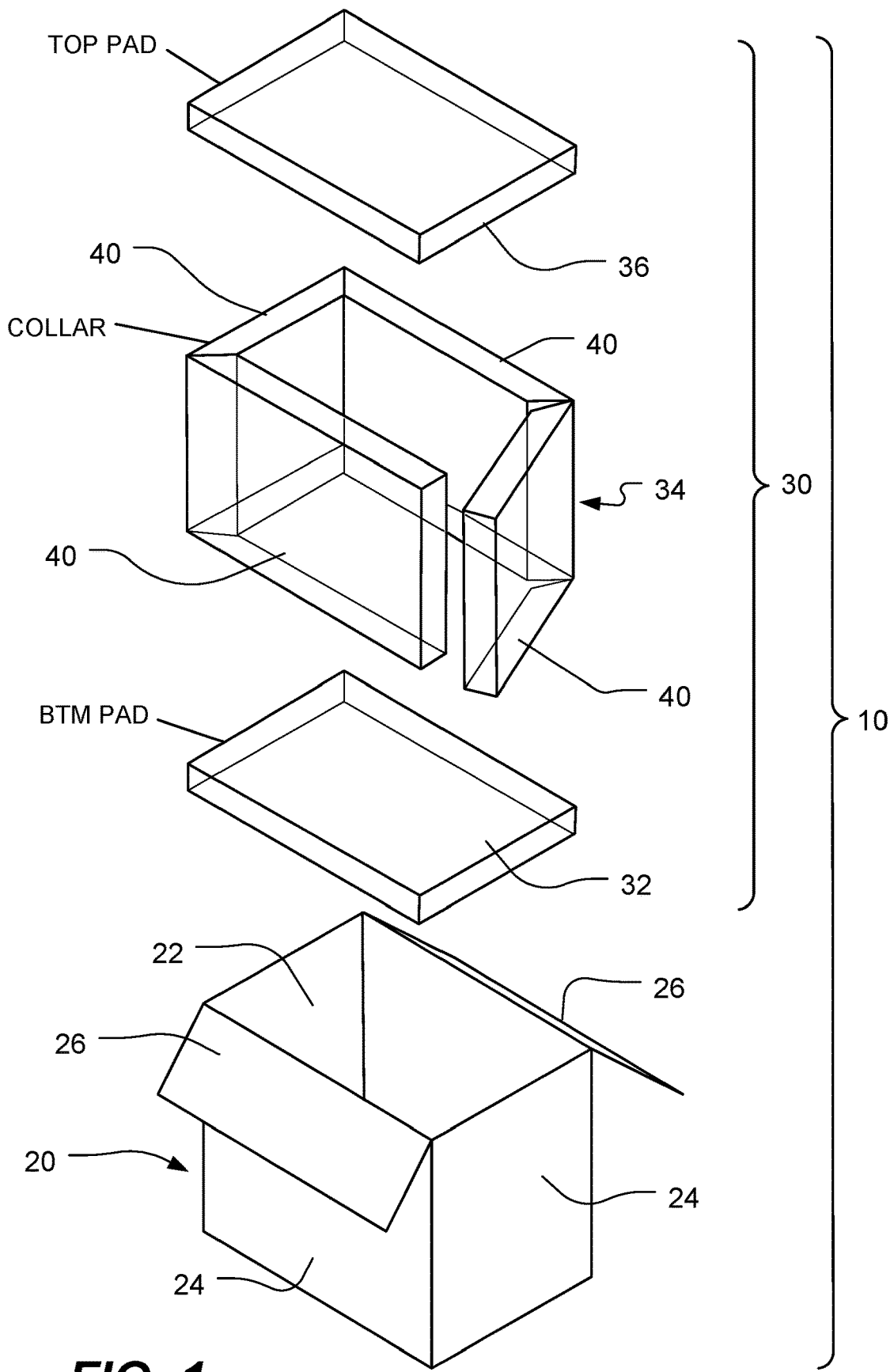
FIG. 1 is an exploded perspective view of an example of an insulated shipping container.

FIG. 1 is an exploded perspective view of an example of an insulated shipping container 10. The shipping container 10 includes a box 20 and one or more thermally insulating pads 30 that fit inside an interior cavity 22 of the box 20. The thermally insulating pad(s) 30 are shaped such that when positioned in the box 20 they provide an interior space to receive the item and optionally a coolant, e.g., ice, dry ice or a gel pack.

The box 20 can be a rectangular prism, and can includes rectangular side walls 24 that define the interior cavity 22. The bottom of the box may similarly be closed off by one or more flaps (not shown due to the perspective view). The top of the box 20 provides an opening to the interior cavity 22. A cover for the box 20 can be provided by one or more flaps 26 that can be folded inwardly from the side walls 24 to close off the top of the cavity 22. In some implementations, the side walls 24, flaps 26 and bottom of the box are all part of a single integral sheet that is folded into an appropriate shape. Alternatively, the cover for the box 20 can be provided by a separate lid that fits over the side walls 24.

The box 20 is a recyclable material. For example, the box 20 can be a cardboard box, e.g., paper board or corrugated cardboard.

As noted above, the container includes one or more thermally insulating pads 30 that fit inside the box 20. Each pad 30 is formed by sealing a compostable insulating material within a recyclable and biodegradable film or compostable film. The film can be water-resistant, water-proof or water-repellant.

The compostable insulting material can be in the form of a solid panel (or multiple solid panels). The panel could be a foam material.

The panel can be relatively inflexible and incompressible, e.g., similar to expanded polystyrene packaging (e.g., Styrofoam™). For example, the panel can have a Young's modulus greater than 1 GPa, e.g., 1-5 GPa.

Alternatively, the panel can be flexible and compressible. For example, the panel can have a Young's modulus less than 1 GPa, e.g., 0.01-1 GPa. In this case, the panel is effectively a pillow or cushion.

The compressibility and flexibility of the panel can be set by controlling the heat and compression used during extrusion of the material, in conjunction with material characteristics such as fiber or particulate size, composition and presence of additives such as adhesive.

In some implementations, the pad includes a single panel. Each pad 30 is relatively thin, e.g., about 0.25-4 inches thick, as compared to the length and width of the pad. The thickness of a pad 30 is considered to be along its narrowest dimension, whereas the length and width of the pad 30 are considered to be along the two directions along the primary face, perpendicular to the thickness.

Each panel can be formed primarily of starch, e.g., an extruded starch, and/or organic fiber pulp. The starch can be a grain starch, e.g., corn starch, wheat starch or sorghum (sorghum is also known as milo), a root starch, e.g., potato starch, a vegetable starch, or combinations thereof. The organic fiber pulp can be a plant fiber pulp, e.g., paper pulp, or pulp from vegetable products, e.g., corn husks, cotton, coconut shell, flax, etc.

A panel formed of organic fiber pulp can be formed by injection molding or compaction, e.g., compacted paper pulp. Other materials that do not interfere with the compostable nature of the panel, e.g., a softener to improve adhesion of the starch, or a preservative or anti-fungal agent, can be present, but only in small quantities. For example, at least 85%, e.g., at least 90-95%, by weight of the panel is starch and/or organic fiber pulp. Polyvinyl alcohol can be present, e.g., 5-10% by weight.

Each panel is "solid", which in this context indicates that the panel holds together as a single unit, rather than being formed of loose-fill pellets. It may be noted that compressed starch pellets would not form a solid part; upon removal of pressure the pellets would disassemble, and increased pressure only fractures or pulverizes the pellets. A solid panel of extruded starch provides significant thermal insulation, while still being compostable.

It is possible for the panels to be a foam material, e.g., to include small pores or voids spread substantially uniformly through the panel. For example, 10-80% of the volume of the panel can be pores or voids, e.g., 25-75%, 25-50%, 10-25%, 50-75%. The maximum size of the pores or voids can be about 1 mm. The density of a panel can be about 0.4-3.5 $g/cm^3$, e.g., 0.6-1.0 $g/cm^3$, 0.8-2.0 $g/cm^3$, 1.0-3.5 $g/cm^3$.

Each panel can be of a uniform homogenous composition. Furthermore, each panel can be a unitary body—that is the body of the panel holds together by itself without adhesives or fasteners to join multiple sections together to form the panel.

Although the panel is thin, as compared to the length and width of the panel, the panel (or stack of panels) is thick enough to provide sufficient thermal insulating function for common commercial applications that require shipment of products, e.g., foods or medical supplies. The thickness of a panel can be about 0.25-1.0 inches, e.g., 0.25-0.75 inches.

Any given panel can have substantially uniform thickness across its primary surface. The surfaces of the panel can be generally flat, or one or more surfaces can be corrugated. Corrugation can increase the effective thickness of the pad, e.g., by a factor of up to 4. In this case, the thickness of the panel can still be uniform, but the panel is shaped with corrugations.

Each panel can include one or more rectangular plates dimensioned to substantially span whichever of the floor, plurality of side walls or cover that the rectangular plate is adjacent. In some implementations, the whole of the panel, when in an unfolded configuration, is also rectangular.

The panels can be formed by an extrusion process. After extrusion, each panel can be cut to the appropriate size. In addition, the edges can optionally be beveled as to provide the beveling of the pads described above. In addition, the panel that provides the collar can be scored, as described below.

The film can be a plastic film. In some implementations, the film is air-tight.

In some implementations, the film is compostable, e.g., a bioplastic that meets ASTM D6400 standards. Suitable materials for a compostable film include polymers based on one or more of polylactic acid (PLA), poly(beta-amino) esters (PBAE), polyhydroxyalkanoate (PHA), polycaprolactones (PCL), polybutyrate adipate terephthalate (PBAT) polyvinylalcohol (PVA), or ethylene vinyl alcohol (EVOH). For example, a combination of PBAT and PE may be suitable. As another example, a combination of PE and PLA may be suitable. In some implementations, the polymer can be mixed with an organic product, e.g., a starch, such as corn starch.

In some implementations, the film is recyclable and biodegradable. A suitable material for the recyclable film is polyethylene or polypropylene. For example, the film can be a low-density polyethylene (LDPE), a medium-density polyethylene (MDPE), a high-density polyethylene (HDPE) or polyethylene terephthalate. An advantage of polyethylene is ease of fabrication and good water resistance.

In some implementations, the film is a paper sheet. If the paper is thin enough or is perforated, the paper is compostable. Optionally, the paper can be lined with a water-repellant coating. Either the inner surface of the film, or the outer surface, or both can be lined with the water-repellant coating. The water-repellant coating can be a compostable material, e.g., wax. In this case, the film with paper and coating is compostable. Alternatively, the water-repellant coating can be a recyclable material. In this case, the film with paper and coating is recyclable.

A problem with starch-based insulation is that it dissolves easily in water. If the item being shipped is cold or a coolant is placed in the interior of the container 10, condensation can form on the interior surfaces of the pad 30. However, a water-proof or water-resistant film prevents liquid, e.g., the condensation, from reaching the starch panel, thus enabling the starch panel to be usable as a thermal insulator in the container.

To fabricate a pad 30, the starch panel can be placed between two sheets of the film. The edges of the film can be heat-sealed to each other, e.g., along the entire perimeter of the panel, thus enclosing and sealing the panel in a pocket of the compostable or recyclable film that has only slightly larger dimension than the panel itself. A suitable sealing temperature is above 100° C. Excess film outside the heat seal can be cut away.

In the directions parallel to the primary surface of the panels, the pocket can be up to about 0.5 inches larger on each side than the panel.

Alternatively, the film can be provided in a tubular form. To fabricate a pad 30, the panel is slid inside the tube of film, and the two open ends of the tube are heat sealed. This forms a pocket in which the panel sits.

In some implementations, the panel sits loose inside the pocket formed by the film. That is, the panel is not bonded or otherwise fixed to the film. Thus, the panel can slide inside the pocket relative to the film. For example, the film can be in sliding contact with the panel. The interior of the pocket can include a small amount of air. In some implementations, the air is vacuumed out before the pocket is sealed.

In some implementations, the panel is affixed to the film. For example, the film can be secured to the panel by heat bonding the film to the panel. As another example, the film can be secured to the panel by an adhesive. The adhesive can be a separate additive, or the adhesive can be provided by applying water to the panel to cause the starch in a portion of the panel at the surface to become tacky such that the film sticks to the panel.

In some implementations, the film directly coats the panel. The film that directly coats the panel can be composed of an organic compostable material, e.g., a wax. The film can be spread in a thin layer on the surface of the panel. The film can be applied in liquid form and then harden on the panel. Alternatively, the film can be sprayed onto the panel. For example, a water-repellant material can be sprayed onto the panel.

The film can be affixed on both the interior and exterior surface of the panel, or on just one surface of the panel, e.g., just the interior surface or just the exterior surface of the panel. In addition, for each of the interior and exterior surface of the panel, the film can be affixed across the entire surface, or on just a portion of the surface, e.g., a perimeter portion along the edge or a central portion that is spaced away from the edge of the panel.

Other than one or panels, there need not be any other thermally insulating material within the film. For example, unless one of the panels fractures due to applied stress, there are no loose pellets or pieces of other insulating material in the volume enclosed by the film. In some implementations, the pad 30 consists of, i.e., includes only, one or more panels, the film, and optionally some air inside the volume enclosed by the film.

Where both the panel and film are compostable, the entire pad can be disposed of as a unit in a composting bin. Where the panel is compostable and film is recyclable, the film can be ripped off the panel manually by the recipient of the package, and then the panel can be disposed of in a composting bin and the film can be disposed of a recycling bin.

In the implementation shown in FIG. 1, the thermally insulating pads 30 include a bottom pad 32, a collar 34, and a top pad 36.

The bottom pad 32 has a length and width that match the bottom of the box 20, or are slightly smaller, e.g., by about an ⅛ inch tolerance, so that bottom pad 32 fits snugly at the bottom of the cavity 22 on the bottom of the box 20.

The collar 34 includes a single panel that is folded into four wall members 40. Each wall member 40 has a height (in the vertical direction) about equal to the height of the box 20, less the combined thickness of the top pad 32 and bottom pad 36. Each wall member 40 has a width (in the lateral direction) that matches the adjacent side wall 24 of the box 20, or is slightly smaller, e.g., e.g., by about an ⅛ inch tolerance. Thus, the collar 34 fits snugly into cavity 22 on top of the bottom pad 32, with each wall member adjacent, e.g., in contact with, one of the side walls 24.

The top pad 36 has a length and width that match the top of the box 20, or are slightly smaller, e.g., e.g., by about an ⅛ inch tolerance, so that the perimeter of the top pad 36 can sits on the wall members 40 of the collar 34 and the top pad 36 itself fits snugly at the cavity 22. When the top of the box 20 is closed, e.g., by closing the flaps 26 or placing a lid, the top pad 36 sits adjacent, e.g., in contact with, the top of the box 20.

In some implementations, the surfaces of the pads 30 are basically flat up to and including their edges. "Basically flat" is used to indicate flat at the scale of the thickness of the pad, but still encompasses the possibility of small scale surface texturing. Thus, the lower rim of the collar 34 simply sits basically flat on the perimeter of the top surface of the bottom pad 32, and the perimeter of the top pad 36 simply sits basically flat on the upper rim of the collar 34. Alternatively, the interior surfaces of each pad, i.e., the surface of the pad facing the cavity and further from the box 20, can be beveled at the edge that is adjacent another pad. Thus, the beveled lower rim of the collar 34 sits on the beveled perimeter of the bottom pad 32, and the beveled perimeter of the top pad 36 sits on the beveled upper rim of the collar 34. In this latter case, the outer surface of each wall member 40 can have a height about equal to the height of the box 20.

FIGS. 2A-2G illustrate an example of construction of the pads 30 of the insulating shipping container 10 shown in FIG. 1.

Referring to FIG. 2A, an exploded perspective view, the collar 34 can be fabricated by forming a solid compostable panel 50 that has a length L approximately equal to or slightly less than the length of the lateral perimeter of the box 20, and a width W approximately equal or slightly less than the height of the box 20. The panel 50 is then placed between two sheets 60 of the compostable or recyclable film. Referring to FIG. 2B, a cross-sectional side view, the two sheets 60 are heat sealed along a path than extends around the entire perimeter of the panel 50. The seal can be positioned no more than about 1 inch, e.g., no more than about ½ inch, from the edge of the panel 50. Excess film outside the heat seal can be cut away.

FIG. 2C is a cross-sectional side view, and FIG. 2D is a perspective view. Referring to FIGS. 2C and 2D, before or after sealing the panel 50 between the sheets 60, one surface of the panel 50 (which will be the inward facing surface of the panel) can be scored in three locations to divide the panel 50 into four rectangular plates 52, which correspond to the four side walls of the collar 34. The length of each plate 52 corresponds to the width of the corresponding side wall 50 of the collar 34. Scoring can be performed by compression with an angled rigid body.

Each score can create a recess 56 that extends across the width W of the panel. The recess 56 extends partially, but not entirely through the thickness of the panel 50. For example, the recess 56 can extend through about 50-75% of the thickness of the panel 50. The scoring can be angled, so the recess has a triangular cross-section.

The reduced thickness of the panel 50 in the scored areas increases the flexibility of the panel so that the panel 50 can be bent at a right angle without breaking. In particular, the panel 50 can be folded inwardly (with the inside surface being the side with the recess 56). This permits the panel 50 to remain as a single unitary part when the collar 34 is folded and placed in the box 20, which can improve thermal insulation by reducing creation of gaps in the insulating material.

FIG. 2E is a schematic exploded perspective view. FIG. 2F is a schematic cross-sectional side view. FIG. 2G is a schematic perspective view. Referring to FIGS. 2E-2G, construction of the top pad 32 and bottom pad 36 is even simpler. A panel 50 is formed having lateral dimensions approximately equal to or slightly less than the corresponding dimensions of the top or bottom the box 20. This panel 50 is then placed between two sheets 60 of the compostable or recyclable film (see FIG. 2E), and the two sheets 60 are heat sealed along a path than extends around the entire perimeter of the panel 50 (see FIG. 2F) to provide the top pad 32 or bottom pad 36. Excess film outside the heat seal can be cut away.

FIGS. 3A-3I illustrate another example of construction of the pads 30 for the insulating shipping container 10. In the example of FIGS. 3A-3I, rather than three pads, the thermally insulating pads 30 include a first three-sectioned pad 70 and a second three-sectioned pad 72.

FIGS. 3A and 3B are schematic exploded perspective views of the two three-sectioned pads. FIGS. 3C-3F are schematic cross-sectional side view of the two three-sectioned pads. FIGS. 3G and 3H are schematic perspective views of the two three-sectioned pads. FIG. 3I is a schematic exploded perspective view showing how the two three-sectioned pads are positioned relative to each other.

These pads 30 are constructed similarly to the pads discussed above for FIGS. 2A-2D, with each pad 70, 72 formed by sealing a solid compostable panel within a compostable or recyclable film. In particular, each three-sectioned pad 70, 72 is constructed in a manner similar to the collar 34 discussed above, but with scoring in two locations rather than three locations.

In particular, referring to FIG. 3A, the first three-sectioned pad 70 can be fabricated by forming a solid compostable panel 50 that has a length L approximately equal to or slightly less than the length of three side walls of the box 20, and a width W approximately equal or slightly less than the height of the box 20. Referring to FIG. 3B, the second three-sectioned pad 72 can be fabricated by forming a solid compostable panel 50 that has a length L approximately equal to or slightly less than the length of top and bottom of the box 20 plus the height of one of the side walls of the box, and a width W approximately equal or slightly less than the lateral length of one of the side walls of the box 20.

Referring to FIGS. 3A-3D, each panel 50 is then placed between two sheets 60 of the compostable or recyclable film, and the two sheets 60 are heat sealed, as discussed above.

Referring to FIGS. 3E-3G, before or after sealing each panel 50 between the sheets 60, one surface of the panel 50 (which will be the inward facing surface of the panel) can be scored in two locations to divide the panel 50 into three rectangular plate 52, which correspond to the four side walls of the collar 34. The length of the plates 52 of the first three-section pad 70 correspond to the width of the three corresponding side walls of the box 20. The length of the plates 52 of the second three-section pad 72 correspond to the width of the top side, the length of the remaining side wall, and the width of the bottom side, respectively, of the box 20.

Together, the resulting two three-sectioned pads 70, 72 cover each of the six sides of the box 20 when inserted in the interior 22 of the box 20.

It should be realized that other configurations are possible for the two three-sectioned pads 70, 72. For example, the first three-sectioned pad could cover the bottom and two opposing sides of the box, and the second three-sectioned pad could cover the top and the other two opposing sides of the box.

FIGS. 4A-4D illustrate yet another example of construction of the pads 30 for the insulating shipping container 10. In the example of FIGS. 4A-4D, rather than three pads, the thermally insulating pads 30 include six pads 80, one for each of the six sides of the box 20.

FIG. 4A is a schematic exploded view of one of the pads. FIG. 4B is a schematic cross-sectional side view of one of the pads. FIG. 4C is a schematic perspective view of one of the pads. FIG. 4D is a schematic exploded perspective view showing how the two three-sectioned pads are positioned relative to each other.

These pads 30 are constructed similarly to the pads discussed above for FIGS. 2E-2G, with each pad formed by sealing a solid compostable panel within the film. Each pad (and each panel of the pad) has a length and width appropriate for the dimensions of the associated side of the box 20, along the lines discussed above.

The example of FIGS. 4A-4D does not require scoring, and consequently can be easier to manufacture. However, the increased number of gaps could decrease the effectiveness of the thermal insulation.

FIGS. 5A-5H illustrate still another example of construction of the pads 30 for the insulating shipping container 10. In the example of FIGS. 5A-5H, rather than three pads, the thermally insulating pads 30 include a three-sectioned pads 90, and three individual pads 92.

FIG. 5A is a schematic exploded perspective view of the three-sectioned pad. FIGS. 5B and 5C are schematic cross-sectional side views of the three-sectioned pad. FIG. 3C is a schematic perspective view of the two three-sectioned pad. FIG. 5E is a schematic exploded view of one of the individual pads. FIG. 5F is a schematic cross-sectional side view of one of the individual pads. FIG. 5G is a schematic perspective view of one of the individual pads. FIG. 5H is a schematic exploded perspective view showing how the two three-sectioned pads are positioned relative to each other.

Referring to FIGS. 5A-5D, the three-sectioned pad 90 is constructed similarly to the three-sectioned pads discussed above for FIGS. 3A-3F, with the pad 90 formed by sealing a solid compostable panel within a compostable or recyclable film. Referring to FIG. 5A, the three-sectioned pad 90 can be fabricated by forming a solid compostable panel 50 that has a length L approximately equal to or slightly less than the height of two side walls of the box 20 plus the length of the bottom of the box 20, and a width W approximately equal or slightly less than the width of one of the sides of the box 20.

Referring to FIGS. 5E-5G, the three individual pads 92 are constructed similarly to the top and bottom pads 32, 36 discussed above for FIGS. 2E-2G, with the pads 92 formed by sealing a solid compostable panel within a compostable or recyclable film. Each pad 92 (and each panel of the pad) has a length and width appropriate for the dimensions of the side of the box 20 which it will line, as generally discussed above.

Although FIGS. 5A-5C show the three-sectioned pad having a center section that corresponds to the bottom of the box, this is not necessary. The center section could correspond to one of the side walls or the top of the box.

Even further configurations are possible for the pads 30, provided each wall of the box is provided with an individual pad or a section of a pad. For example, there could be three two-sectioned pads, or a three-sectioned pad, two-sectioned pad and an individual pad.

Moreover, there could be just a single pad 100 that fits inside the box 20 and covers all six sides of the box 20. For example, FIG. 6, which is a schematic top view of a pad 100 in an unfolded configuration, illustrates a single six-sectioned pad. To fabricate this six-sectioned pad 100, the panel can be formed in a "cross-shape", or another shape that when folded will correspond to the sides of the rectangular prism of the box 20. The panel is sandwiched between two sheets, as discussed above, and the edges are sealed along a path that runs close to the perimeter of the panel. Excess material of the sheets can be cut off. The panel can be scored with cuts 56 in five locations to divide the panel into six sections. The scoring corresponds to the positions necessary for the panel to be folded such that each section corresponds to one of the sides of the box 20. Although the implementation shown in FIG. 6 is for a cubical box, this is not required.

Figure 6:
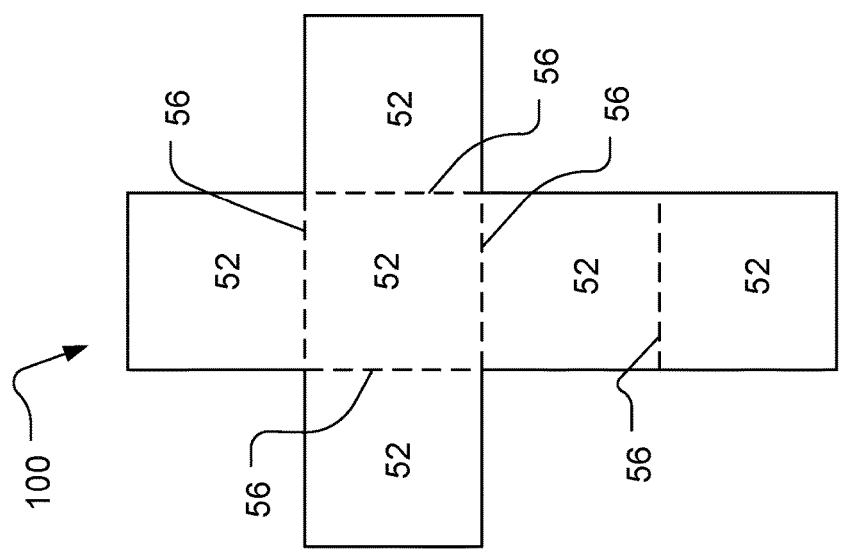
FIG. 6 illustrates an example that includes a single six-sectioned pad.

The example of FIG. 6 may provide improved good thermal insulation due to fewer gaps, and there can be a convenience for the customer to have just a single pad for each box. On the other hand, this configuration may have a cumbersome form factor.

The box 20 and pad or pads 30 that form the insulated shipping container 10 can be provided as an unassembled kit, and be assembled by a customer. For example, the box 20 and pads 30 could be shrink-wrapped or otherwise sealed together in packaging.

In any of the various examples discussed above, one or more apertures, e.g., about ⅛ to 5 inches across, can be formed through the film 60 on the side of the pad 30 closer to the box 20, that is the side opposite the opposite cavity in which the item to be shipped is to be positioned. These apertures are not present on the side facing the cavity in which the item to be shipped is to be positioned; the film 60 on that side of the pad 30 is unbroken. The apertures can prevent pocket from acting like a balloon when the pad is inserted into the box—the film 60 can collapse against primary surfaces of the panels.

In some implementations, a pad includes only one panel in the pocket formed by the film. However, referring to FIGS. 7A and 7B, cross-sectional side views, in some implementations, the pad 30 includes multiple panels 50. The panels 50 are stacked along their thickness direction, and not arranged side-by-side. This permits fabrication of a thicker pad 30, thus increasing the thermal insulating capability. For example, this permits the total thickness of the pad to be about 1-4 inches. In addition, avoiding gaps between that would occur with side-by-side panels can improve thermal insulation. In the example shown in FIG. 7A, there are three panels 50a, 50b and 50c, but there could be just two panels or four or more panels.

Figure 7A:
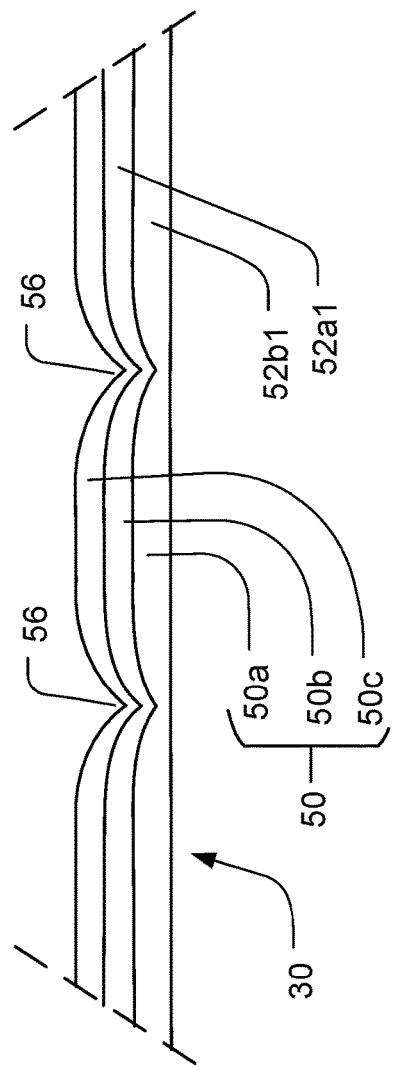
FIGS. 7A and 7B illustrates an example of multiple multi-section panels enclosed in a water-proof film, in an unfolded and folded state, respectively.
Figure 7B:
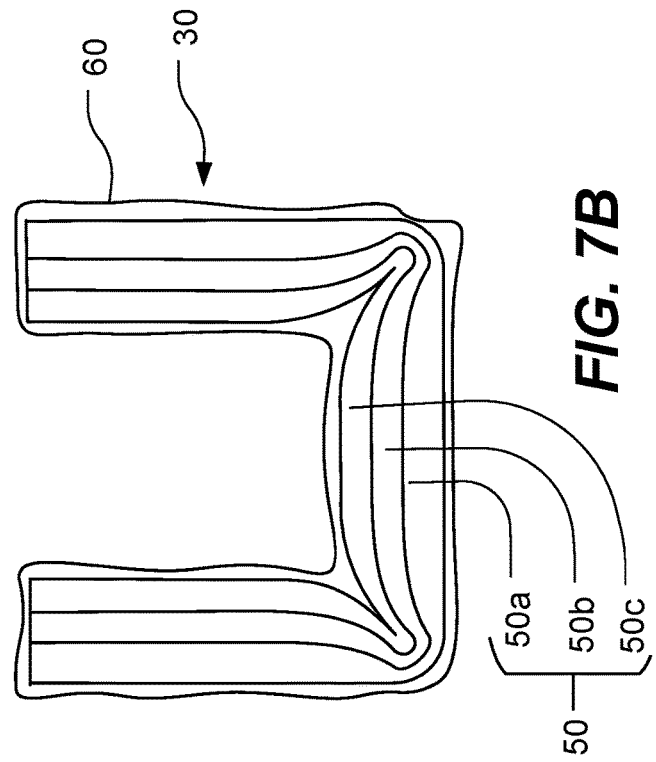

For a multi-section panel, when the panels 50 are scored, the scoring 56 can be performed by compressing the stack of panels along a line (rather than cutting the panels). As a result, in the scored region some of the panels can be driven partially into the underlying panel.

Where the panels 50 are multi-section panels, sections at each end of the pad can be shorter than the section immediately underneath to compensate for the stacking arrangement such that the ends of panels are substantially aligned. For example, as shown in FIG. 7A, section 52b1 is shorter than the underlying section 52a1. In addition, the ends of the sections at the end of each pad can be cut at an angle. For example, as shown in FIG. 7A, the ends of sections 52a1 and 52b1 can be cut at an angle, e.g., a 45° angle. Thus, as shown in FIG. 7B, when the multi-section panels are folded inwardly, e.g., to form the U-shaped pad, the ends of the panels 50 align.

In the various implementations discussed above, the individual pads 30 will rest on one another when inserted in the cavity of the box 20. However, the pads 30 are not fixed to each other, e.g., the pads are not secured by adhesive or interlocking components to each other.

Figure 8:
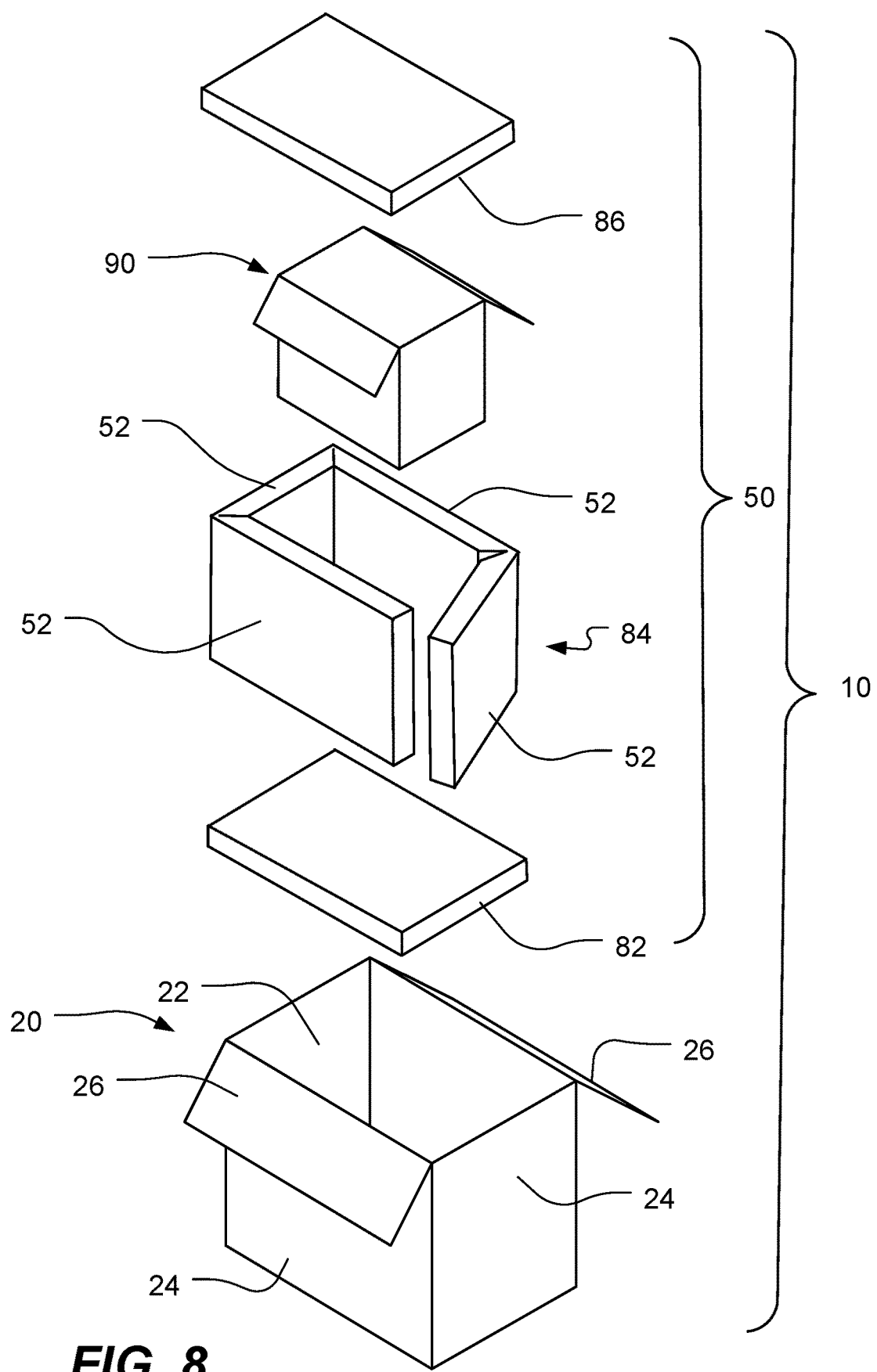
FIG. 8 illustrates an example of using solid compostable panels, without a water-proof film, for an insulated shipping container.

In some implementations, the solid compostable panels could be used, but without enclosing or coating the panels with a water-proof film. FIG. 8 is an exploded perspective view of an example of another implementation of an insulated shipping container 10. The shipping container 10 includes a recyclable box 20 and multiple thermally insulating compostable panels 50 that fit inside the interior cavity 22 of the box 20. The panels 50 are shaped such that when positioned in the box 20 they provide an interior space to receive the item and optionally a coolant, e.g., ice, dry ice or a gel pack.

Optionally, a recyclable interior box 90, e.g., a cardboard box, can fit into a space defined by the interior of the panels 50. In this case, the interior cavity of the interior box 90 provides the space to receive the item and optionally a coolant. The interior box 90 can provide additional thermal insulation, and can protect the panels from water, e.g., condensation caused by coolant. However, as noted above, the item and coolant could be placed into the interior space, without using the interior box.

Each panel 50 can be fabricated as discussed above, e.g., formed primarily of extruded milled sorghum, so as to be compostable. However, the panels are not coated with, enclosed in, or otherwise protected by a water-proof film. Rather, the panels 50 are simply inserted into the cavity 22 in the box. One or more of the panels 50 can be a multi-section panel, which is scored as discussed in the various implementations discussed above, and then folded at right angle to provide multiple rectangular plates.

In the implementation shown in FIG. 1, the thermally insulating panels 50 include a bottom panel 82, a collar 84, and a top pad 86.

The bottom panel 82 has a length and width that match the bottom of the box 20, or are slightly smaller, e.g., by about an ⅛ inch tolerance, so that bottom panel 82 fits snugly at the bottom of the cavity 22 on the bottom of the box 20.

The collar 84 includes a single panel that is folded into four rectangular plates. The four rectangular plates provide four wall members 40, which are equivalent to the wall members discussed with respect to FIG. 1, but without the compostable or recyclable film. Each wall member 40 has a height (in the vertical direction) about equal to the height of the box 20, less the combined thickness of the top panel 82 and bottom panel 86. Each wall member 40 has a width (in the lateral direction) that matches the adjacent side wall 24 of the box 20, or is slightly smaller, e.g., e.g., by about an ⅛ inch tolerance. Thus, the collar 84 fits snugly into cavity 22 on top of the bottom panel 82, with each wall member 40 adjacent, e.g., in contact with, one of the side walls 24.

The top panel 86 has a length and width that match the top of the box 20, or are slightly smaller, e.g., e.g., by about an ⅛ inch tolerance, so that the perimeter of the top panel 86 can sit on the wall members 40 of the collar 84 and the top panel 86 itself fits snugly at the top of the cavity 22.

Although FIG. 8 illustrates a configuration for the panels 50 that is similar to the configuration of pads 30 in FIGS. 1 and 2A-2G, other configurations for the panels, e.g., equivalent to those shown in FIGS. 3A-3I, FIGS. 4A-4D, FIGS. 5A-5H, or 6, are possible. Similarly, multiple panels 50 can be stacked, e.g., as illustrated in FIGS. 7A-7B, but again without the compostable or recyclable film.

Although milled sorghum is discussed above, as noted it may be possible to form the panel out of a grain starch, such as corn starch or wheat starch. However, sorghum is generally superior in that it can provide superior thermal insulation than corn starch. In addition, the particulates of milled sorghum may be more amenable to extrusion.

Figure 9:
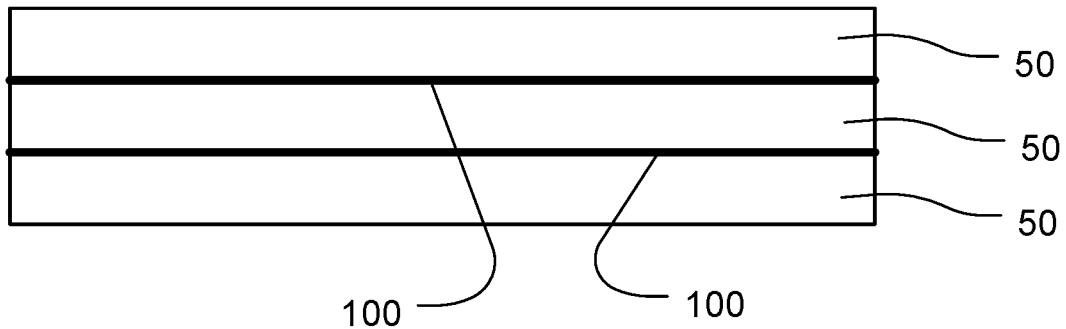
FIG. 9 illustrates multiple panels that are laminated together.

Referring to FIG. 9, although in some implementations multiple panels can be stacked without being joined, it is also possible for multiple panels 50 to be stacked and laminated together. This can increase the total thickness of the resulting panel, e.g., to 1 to 3 inches thick. The stacked panels can be joined by a thin layer of compostable adhesive 100.

Figure 10A:
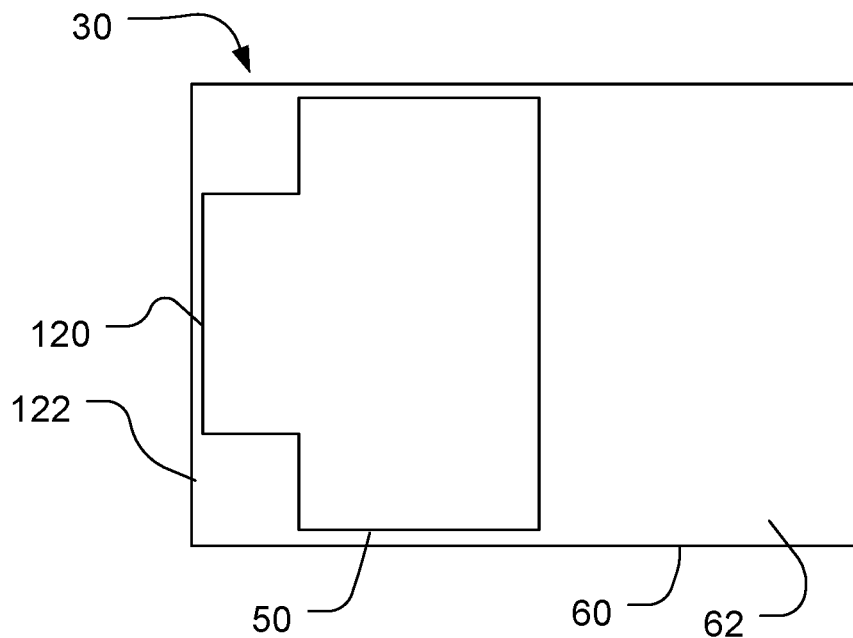
FIGS. 10A and 10B are a plan view and a cross-sectional side view, respectively, of a pad.
Figure 10B:
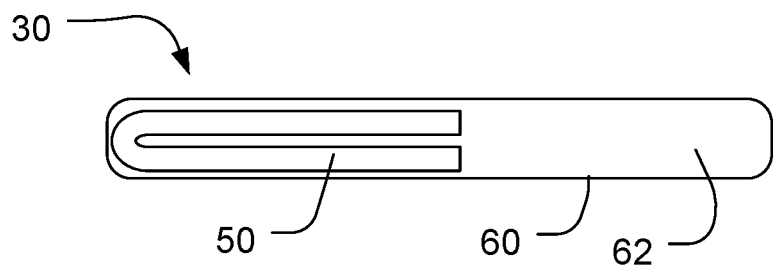

FIGS. 10A and 10B illustrate another implementation of a pad 30 that is particularly easy to assemble and insert into a shipping container, and can provide insulation for the floor and four sides of a shipping container. The pad 30 includes a panel 50 that is enclosed in a pocket 62 formed by a film 60. The panel 50 can be a single panel. Alternatively, the panel 50 can include multiple stacked layers. However, if multiple independently slidable panels are present, they should be stacked vertically within the pocket rather than spaced apart laterally.

As shown in FIG. 10B, the panel 50 is shown folded in half and inserted into the pocket 62 formed by the film 60. A narrower edge 120 of the panel 50 can be positioned adjacent an edge 132 of the pocket 62. The panel 50 can fill about half of the pocket 62. At this stage, the film surrounds the panel, but isn't positioned in any interior space formed by the panel.

Figure 11:
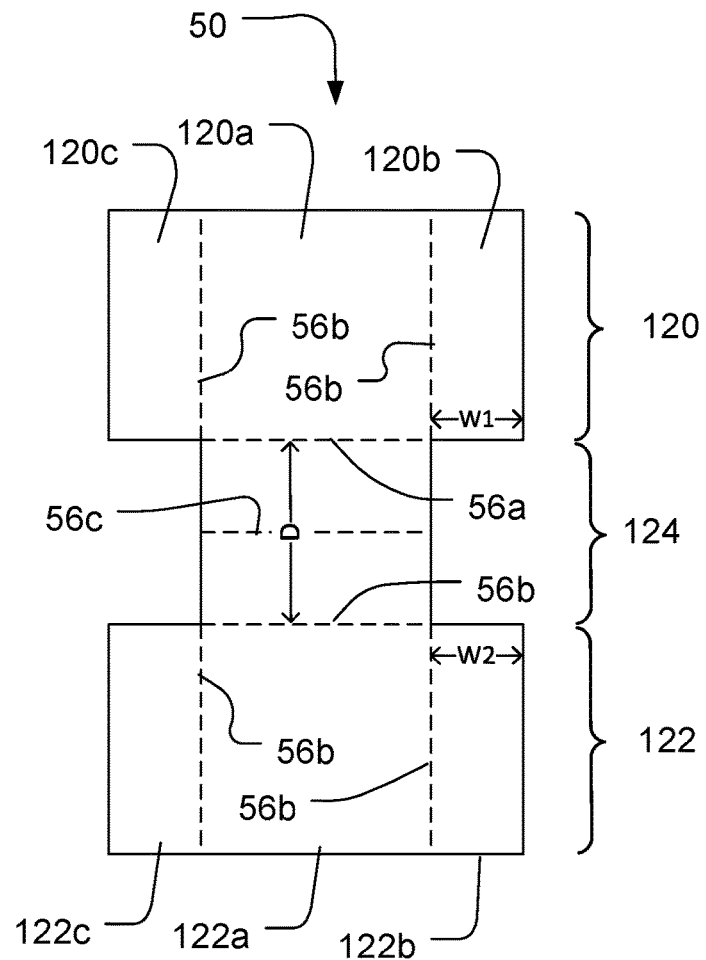
FIG. 11 is a plan view of a panel from the pad assembly of FIGS. 10A and 10B.

FIG. 11 illustrates the panel 50 in an unfolded state. The panel 50 includes two wider sections 120, 122 that are connected by a narrower section 124. Each section 120, 122, 124 can be rectangular. The first wider section 120 includes a central portion 120a and two flaps 120b, 120c that project past the narrower section 124 on each side by a width W1. Similarly, the second wider section 122 includes a central portion 122a and two flaps 122b, 122c that project past the narrower section 124 on each side by a width W2. The total of W1+W2 is between and two (1-2) times than the distance D between the two wider sections 120a, 120b, i.e., across the narrow section. The width W1 can be equal to the width W2.

In some implementations, the panel 50 is scored along the junction between the narrow section 122 and each wider section 120, 124, e.g., as shown by score lines 56a. In some implementations, the panel is scored along the junction between each flap 120b, 120c, 122b, 122c, and the respective central portion 120a, 120b of the respective wider section 120, 122, e.g., as shown by score lines 56b. In some implementations, the narrower section 124 is scored across its width (i.e., parallel to the line along which the narrower section 124 is joined to the wider sections 120, 122), e.g., as shown by score line 56c. The score in the narrower section 124 can be located at the midpoint of the narrower section 124 between the wider sections 120, 122.

The panel 50 can be fabricated by being molded, e.g., injection molded, into the "I" shape with wider and narrower sections, or the panel 50 can be fabricated as a rectangular body and then recesses cut out on opposite edges of the body sides to define the narrower section 124.

To initially assemble the pad, the panel is folded in about half. For example, the panel can be folded along the midline of the narrower section 124, e.g., along the score 56c. The folded panel 50 is then enclosed in the film 60. The film has a width (measured parallel to the fold) about equal to the panel 50, but has a length (measured perpendicular to the fold) slightly larger than about twice that of the folded panel.

Figure 12:
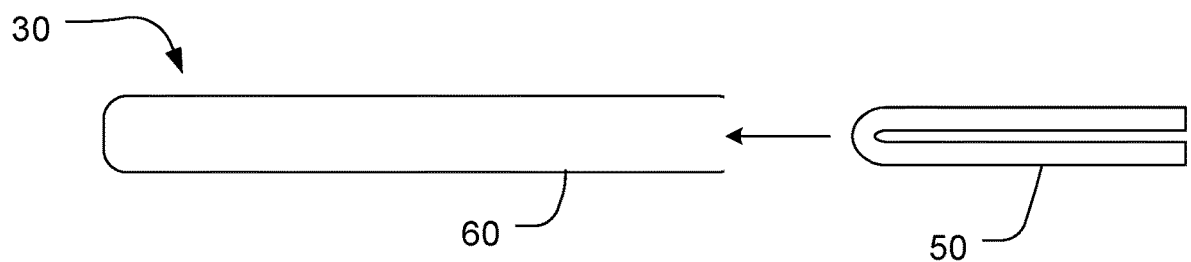
FIG. 12 illustrates a method of assembly of the pad.

As shown in FIG. 12, to enclose the panel 50, the panel 50 can be inserted into a bag of film 60 that is open at one end. The open end of the bag of film 60 can then be sealed, providing the assembly shown in FIGS. 10A and 10B. Alternative, the panel 50 can be inserted into a tube of film 60 that is open at opposite ends, and the two opposite ends of the tube can then be sealed. Alternatively, the panel 50 can be placed between two sheets of the film, and the edges of the film can be sealed, e.g., along the entire perimeter of the panel.

Sealing of the film 60 can be performed by heat-sealing, although adhesive bonding might also be practical. A suitable sealing temperature for heat-sealing is above 100° C. Excess film outside the seal can be cut away.

The pad 30 now includes a sealed bag provided by the film 60, and the panel 50 is sealed inside the pocket formed by the bag of film 60. The pad 30 can be shipped to customers in this form.

The pad 30 can then be folded into a box-like shape and then inserted into a shipping container by a customer or by a vendor. Referring to FIG. 13A. if the panel 50 is if folded, then it is unfolded. While still inside the film 60, the panel 50 is refolded at right angles along the lines where the narrower section 124 is joined to the wider sections 120, 122, e.g., along scores 56a.

Then, as shown in FIG. 13B, the flaps 120b, 120c, 122b, 122c are folded inwardly, e.g., along scores 56b, so that flaps from each wide section 120, 122 are adjacent. So the edge of flap 120b is adjacent the edge of flap 122b, and the edge of flap 120c is adjacent the edge of flap 122c.

As such, the panel 50 now forms a generally rectilinear box 130 that is open at the top, with the narrower section 124 forming the bottom, the central sections 120a, 122b of the two wider sections 120, 122 forming two opposite side walls, the two flaps 120b, 122b from each wider section 120, 122 providing one side wall, and the other two flaps 120c, 122c from each wider section 120, 122 providing the remaining side wall.

Finally, as shown in FIGS. 13C and 13D, the end of the bag of film 60 adjacent the open end of the box 130 is pushed inwardly, as shown by arrow A in FIG. 13C, until the bag of film lines both the outer surface and the inner surface of the box 130, e.g., as shown in FIG. 13D. The shape and tension in the film 60 may be such that the bag of film 60 serves to retain the panel 50 in the folded box configuration. Alternatively, the panel 50 can be secured in the folded box configuration with adhesive or tape. The pad can now be inserted into a shipping container. Alternatively, the pad may be inserted into a shipping container before the end the bag is pushed inwardly, and the end of the bag of film can be pushed inwardly with the container retaining the panel 50 in the folded box configuration.

Such a pad is very easy to manufacture, having only limited parts and not requiring complex cuts or shape, and is easy for a customer or vendor to assemble into proper shape as packaging for the shipping container.

FIGS. 14-15 illustrate an implementation of a pad that similar to the implementation of FIGS. 11-13D, but rather than the panel having recess that defines a narrow section, a T-shaped slit is formed on each side of the panel. Features otherwise not described can be assumed to be the same as the implementation of FIGS. 11-13D.

The panel 50 includes two sections 120, 122 that are connected by a third section 124. The section 124 can be rectangular, whereas the sections 120, 122 can be U-shaped.

A T-shaped slit 130 is formed, e.g., cut or stamped, on each side of the panel 50. The T-shaped slit 130 includes a first slit 132 that extends inwardly from the edge of the panel 50 to form the stem of the "T", and a second slit 134 at the inner end of the first slit and that extends perpendicular to the first slit 132 to form the cross of the "T". The first slit 132 extends along the midline, thus separating a portion of the sections 120, 122 from each other. The second slit 134 defines two opposing edges of the third section 124, and defines end flaps 120d, 120e, 122d, 122e, as described further below. The length L1 of the first slit 132 can be between one-half and one (½ to 1) times the length L2 of the second slit 134.

Similar to the embodiment of FIG. 11, the panel 50 of FIG. 14 can be covered with the film 60 to provide the pad 30, and the panel 50 can be folded into a box-like shape.

Referring to FIG. 15, if the panel 50 is if folded along the mid-line 56c, then it is unfolded. While still inside the film 60, the panel 50 is refolded at about right angles along the lines 56b that are collinear with the second slits 134; this folds the flaps 120*b*-120*e*, 122*b*-122*e* inwardly. The flaps 120*d*, 120*e*, 122*d*, 122*e* can then be folded inwardly along lines 56*a* that extend parallel to the first slit 132 and intersect the ends of the second slit 134. Then the flaps 120*a*, 122*a* can be folded inwardly along lines the lines 56*a*; this brings the panel into a box-like configuration. Depending on the relative length of L1 to L2, some or all of the flaps that form the side walls may overlap. For example, flaps 120*c*, 122*c* can partially or entirely overlap, and flaps 120*b*, 122*b* can partially or entirely overlap. In addition, the end flaps 120*d*, 120*e*, 122*d*, 122*e* will overlap a portion of the floor of the box that is defined between the fold lines 56*a*.

Some or all of the lines along which the panel is folded can be scored.

It should be understood that although various terms such as "top", "bottom", "vertical" and "lateral" are used, these terms indicate relative positioning of components under the assumption that an opening to the box 20 is at the top, and don't necessarily indicate an orientation relative to gravity; in use, or even during assembly, the container could be on its side or upside down relative to gravity. The term "slightly" indicates no more than about 5%, e.g., no more than 2%.

A number of embodiments have been described. Nevertheless, it will be understood that various modifications may be made without departing from the spirit and scope of the invention. Accordingly, other embodiments are within the scope of the following claims.

What is claimed is:

1. A thermal insulation article for placement in a shipping container to hold an item, comprising:
    a thermally insulating pad shaped to be positioned in a cavity of a rectangular prism shipping container to be adjacent to and cover from two to five of out of a floor, four side walls and cover of the container while leaving an interior space to receive the item, wherein the thermally insulating pad includes
        a layer formed primarily of starch that holds together as a single unit, the layer having opposite surfaces having a length and a width with a thickness between the opposite surfaces that is smaller than the length and the width, and
        first and second paper sheets sandwiching and directly secured to the layer;
    wherein the pad is scored with the layer compressed along a line so as to be foldable into a plurality of rectangular sections dimensioned to substantially span whichever of the floor, plurality of side walls or cover that the rectangular sections are adjacent with the layer extending through the fold.

2. The article of claim 1, wherein the first and second paper sheets are secured to the layer by an adhesive other than the starch.

3. The article of claim 1, comprising a water-repellant coating on the first and second paper sheets.

4. The article of claim 1, wherein the pad is scored along at least two lines so as to be foldable into three rectangular sections.

5. The article of claim 4, wherein the at least two lines are parallel.

6. The article of claim 5, wherein the pad is scored along just the two lines so as to be foldable into exactly three rectangular sections.

7. The article of claim 1, wherein the starch comprises a vegetable starch.

8. The article of claim 1, wherein the panel has a thickness between about ¼ and 1 inch.

9. The article of claim 1, wherein the pad is scored to form a recess that extends through about 50-75% of the thickness of the panel.

10. A thermal insulation article for placement in a shipping container to hold an item, comprising:
    a thermally insulating pad shaped to be positioned in a cavity of a rectangular prism shipping container to be adjacent to and cover from two to five of out of a floor, four side walls and cover of the container while leaving an interior space to receive the item, wherein the thermally insulating pad includes
        a plurality of layers, each layer formed primarily of starch that holds together as a single unit, each layer having opposite surfaces having a length and a width with a thickness between the opposite surfaces that is smaller than the length and the width,
        a paper film forming a pocket enclosing the plurality of layers and providing both an interior surface of the pad to face the interior space and an exterior surface of the pad to face the respective floor, plurality of side walls or cover.

11. The article of claim 10, wherein the paper film encloses the plurality of layers without being bonded to the layers.

12. The article of claim 10, wherein the paper film is affixed to a portion but not all of a surface of a layer from the plurality of layers.

13. The article of claim 10, wherein an interior of the pocket includes air between the plurality of layers and the paper film.

14. The article of claim 10, wherein the plurality of layers are stacked along their thickness direction.

15. A thermal insulation article for placement in a shipping container to hold an item, comprising:
    a thermally insulating pad shaped to be positioned in a cavity of a rectangular prism shipping container to be adjacent to and cover from two to five of out of a floor, four side walls and cover of the container while leaving an interior space to receive the item, wherein the thermally insulating pad includes
        a layer formed primarily of non-corrugated starch that holds together as a single unit, the layer having opposite surfaces having a length and a width with a thickness between the opposite surfaces that is smaller than the length and the width, and
        first and second recyclable paper sheets sandwiching and directly affixed to the layer;
    wherein the pad is scored along a line so as to be foldable into a plurality of rectangular sections dimensioned to substantially span whichever of the floor, plurality of side walls or cover that the rectangular sections are adjacent with the layer extending through the fold.

16. The article of claim 15, wherein the pad is scored by being compressed along the line.

17. The article of claim 16, wherein the pad is scored after the layer is sealed between the first and second recyclable paper sheets such that at least one of the first and second recyclable paper sheets are compressed into the score.

18. The article of claim 15, wherein the pad is scored by a portion of the layer being cut out along the line.

19. The article of claim 15, wherein the pad is sufficiently flexible to be folded.

20. A thermal insulation article for placement in a shipping container to hold an item, comprising:
    a thermally insulating pad shaped to be positioned in a cavity of a rectangular prism shipping container to be adjacent to and cover from two to five of out of a floor, four side walls and cover of the container while leaving an interior space to receive the item, wherein the thermally insulating pad includes
- a panel formed primarily of starch that holds together as a single unit, the panel having opposite surfaces having a length and a width with a thickness between the opposite surfaces that is smaller than the length and the width, and
- a recyclable paper sheet surrounding the panel and providing both an interior surface of the pad to face the interior space and an exterior surface of the pad to face the respective floor, plurality of side walls or cover, the recyclable paper sheet affixed to the panel along a portion but not all of the opposite surfaces of the panel to form a pocket containing air;

wherein the panel is scored along a line so as to be foldable into a plurality of rectangular sections dimensioned to substantially span whichever of the floor, plurality of side walls or cover that the rectangular sections are adjacent with the panel extending through the fold.

21. The article of claim 20, wherein the panel being scored comprises a portion of the panel being cut out along the line.

22. The article of claim 21, wherein the panel formed primarily of starch is porous.

23. The article of claim 21, wherein the panel formed primarily of starch is corrugated.

24. The article of claim 20, wherein the panel being scored comprises the panel being compressed along the line.

25. The article of claim 24, wherein the panel is scored after the panel is sealed between the first and second recyclable paper sheets such at least one of the first and second recyclable paper sheets are compressed into the score.

26. The article of claim 24, wherein the panel formed primarily of starch is porous.

27. The article of claim 24, wherein the panel formed primarily of starch is corrugated.

28. The article of claim 20, wherein the pad is sufficiently flexible to be folded.

* * * * *